US011903098B2

(12) United States Patent
Scanlon

(10) Patent No.: US 11,903,098 B2
(45) Date of Patent: *Feb. 13, 2024

(54) FOOD PRODUCT TEMPERATURE REGULATION UNIT

(71) Applicant: Hatco Corporation, Milwaukee, WI (US)

(72) Inventor: John Scanlon, Milwaukee, WI (US)

(73) Assignee: Hatco Corporation, Milwaukee, WI (US)

( * ) Notice: Subject to any disclaimer, the term of this patent is extended or adjusted under 35 U.S.C. 154(b) by 598 days.

This patent is subject to a terminal disclaimer.

(21) Appl. No.: 17/001,213

(22) Filed: Aug. 24, 2020

(65) Prior Publication Data

US 2020/0389941 A1 Dec. 10, 2020

Related U.S. Application Data

(63) Continuation of application No. 15/421,096, filed on Jan. 31, 2017, now Pat. No. 10,791,590.

(Continued)

(51) Int. Cl.
*H05B 3/06* (2006.01)

(52) U.S. Cl.
CPC .................................... *H05B 3/06* (2013.01)

(58) Field of Classification Search
CPC ................................ H05B 3/06; A47J 36/248
See application file for complete search history.

(56) References Cited

U.S. PATENT DOCUMENTS 1,668,417 A 5/1928 McConnell
2,456,881 A 12/1948 Leather
(Continued)

FOREIGN PATENT DOCUMENTS

CN 1761414 A 4/2006
CN 103705131 A 4/2014
(Continued)

OTHER PUBLICATIONS

9417DN, Nutone 70 CFM Heat-A-Vent Bathroom Fan with One-Bulb Lamp Heater for 4" Duct, retrieved May 21, 2019 from https://www.amazon.com/9417DN-Nutone-Bathroom-One-Bulb-Heater/dp/B0039PVIT0?ie=UTF8&*Version*=1&*entries*=0.
(Continued)

*Primary Examiner* — Erin McGrath
(74) *Attorney, Agent, or Firm* — Foley & Lardner LLP

(57) ABSTRACT

A temperature regulation unit includes a housing, an electrical connector, a fan, a thermal element, a cover, and a light. The housing has an upper end and a lower end. The housing defines an internal cavity. The electrical connector extends from the upper end of the housing. The fan is positioned within the internal cavity of the housing and is configured to provide an airflow. The thermal element is positioned within the internal cavity. The thermal element is configured to thermally regulate a temperature of the airflow. The cover at least partially encloses the lower end of the housing. The light is disposed along at least one of the cover or the housing. The housing has an angled portion that extends at an angle from the electrical connector. The angled portion defines a plurality of vents positioned to provide an inlet air flow path from an external environment into the internal cavity.

8 Claims, 13 Drawing Sheets

Related U.S. Application Data

(60) Provisional application No. 62/354,414, filed on Jun. 24, 2016, provisional application No. 62/289,762, filed on Feb. 1, 2016.

(56) References Cited

U.S. PATENT DOCUMENTS

| | | | | |
|---|---|---|---|---|
| 2,619,578 | A | 11/1952 | Jepson et al. | |
| 2,839,657 | A | 6/1958 | Mast | |
| 4,328,818 | A | 5/1982 | Glucksman | |
| 5,668,920 | A | 9/1997 | Pelonis | |
| 6,240,247 | B1 | 5/2001 | Reiker | |
| 6,587,642 | B1 | 7/2003 | King | |
| 7,484,860 | B2 | 2/2009 | Demarest et al. | |
| 7,500,760 | B2 | 3/2009 | Byrne | |
| 7,503,675 | B2 | 3/2009 | Demarest et al. | |
| 7,748,861 | B2 | 7/2010 | Byrne et al. | |
| 7,845,831 | B2 | 12/2010 | Byrne | |
| 8,326,135 | B1 | 12/2012 | Gose | |
| 8,723,086 | B2 | 5/2014 | McMahan | |
| 10,208,946 | B2 | 2/2019 | Roca et al. | |
| 2004/0159002 | A1 | 8/2004 | Carlucci et al. | |
| 2013/0170234 | A1* | 7/2013 | Fang | F21V 29/67<br>165/104.34 |
| 2014/0102470 | A1 | 4/2014 | Lombardi et al. | |
| 2014/0254135 | A1 | 9/2014 | Nolan et al. | |

FOREIGN PATENT DOCUMENTS

| | | | |
|---|---|---|---|
| CN | 104037271 | A | 9/2014 |
| CN | 205181056 | U | 4/2016 |
| EP | 2 775 224 | A2 | 9/2014 |
| GB | 0 486 319 | A | 6/1938 |

OTHER PUBLICATIONS

International Search Report and Written Opinion, PCT/US2017/038960, Hatco Corporation, 18 pages (dated Feb. 13, 2018).

* cited by examiner

FOOD PRODUCT TEMPERATURE REGULATION UNIT

CROSS-REFERENCE TO RELATED PATENT APPLICATIONS

This application is a continuation of U.S. patent application Ser. No. 15/421,096, filed Jan. 31, 2017, which claims the benefit of U.S. Provisional Patent Application No. 62/289,762, filed Feb. 1, 2016, and U.S. Provisional Patent Application No. 62/354,414, filed Jun. 24, 2016, all of which are incorporated herein by reference in their entireties.

BACKGROUND

Food products may need to be maintained at a certain temperature (e.g., before being served to a customer, etc.). For example, many food products need to be maintained in a certain temperature range to provide a desired eating experience and/or to comply with food safety regulations. Food products are traditionally maintained at a desired temperature using a unit that provides a temperature-controlled environment. The unit may include one or more heating elements that heat the food products using radiative heating methods.

SUMMARY

One embodiment relates to a temperature regulation unit. The temperature regulation unit includes a housing, an electrical connector, a fan, a thermal element, a cover, and a light. The housing has an upper end and a lower end. The housing defines an internal cavity. The electrical connector extends from the upper end of the housing. The fan is positioned within the internal cavity of the housing and configured to provide an airflow. The thermal element is positioned within the internal cavity. The thermal element is configured to thermally regulate a temperature of the airflow. The thermal element includes at least one of a heater or a thermoelectric cooler. The cover at least partially encloses the lower end of the housing. The light is disposed along at least one of the cover or the housing. The housing has an angled portion that extends at an angle from the electrical connector. The angled portion defines a plurality of vents positioned to provide an inlet air flow path from an external environment into the internal cavity.

Another embodiment relates to a temperature regulation unit. The temperature regulation unit includes a housing, an electrical connector, a fan, and a thermal element. The housing has an upper end and a lower end. The housing defines an internal cavity. The electrical connector is positioned at the upper end of the housing. The fan is positioned within the internal cavity of the housing and is configured to provide an airflow. The thermal element is positioned within the internal cavity. The thermal element is configured to thermally regulate a temperature of the airflow, The thermal element includes at least one of a heater or a thermoelectric cooler. The housing has an angled portion that extends at an angle from the electrical connector. The angled portion defines a vent positioned to provide an inlet air flow path from an external environment into the internal cavity.

Still another embodiment relates to a temperature regulation unit. The temperature regulation unit includes a housing, an electrical connector, a bracket, a conduit, processing electronics, a fan, and a thermal element. The housing has an upper end and a lower end. The housing defines an internal cavity. The electrical connector extends from the upper end of the housing. The bracket is positioned within the internal cavity of the housing. The bracket includes a first flange and a second flange extending from the first flange. The first flange has a first side and an opposing second side. The first flange defines an aperture. The conduit is positioned within the internal cavity of the housing and defines a passage. The conduit has a first end and an opposing second end. The conduit extends through the aperture of the first flange such that the first end of the conduit is positioned above the first side of the first flange and the opposing second end is positioned below the opposing second side of the first flange. The second flange extends longitudinally along the conduit from the first flange toward the opposing second end of the conduit. The processing electronics are positioned within the internal cavity and disposed on the second flange. The fan is positioned within the internal cavity of the housing and external to the passage of the conduit. The fan is secured to the first side of the first flange and positioned proximate the first end of the conduit. The fan is configured to provide an airflow to the passage of the conduit. The thermal element is positioned within the passage of the conduit. The thermal element is configured to thermally regulate a temperature of the airflow flowing through the conduit and out of the opposing second end of the conduit. The thermal element includes at least one of a heater or a thermoelectric cooler.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
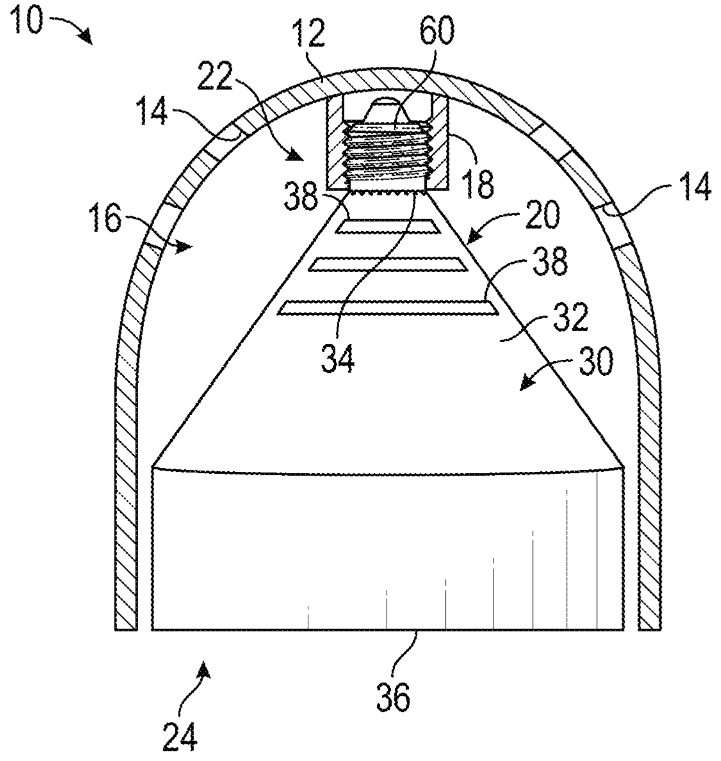
FIG. 1 is a front, partial cross-sectional view of a temperature regulation system, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a temperature regulation unit includes a thermal element (e.g., a heating element, a cooling element, etc.) and a fan. The temperature regulation unit is configured to heat and/or cool food products and/or a target area through a convective heat transfer operation. The fan is configured to move an airflow through the temperature regulation unit and across the thermal element. A shade and/or shroud of the temperature regulation unit may be configured to direct the airflow to one or more temperature controlled zones. The thermal element is configured to thermally regulate a temperature of the airflow exiting the shade and/or shroud to a target temperature to maintain the food products and/or the target area at a desired temperature. By way of example, the thermal elements may heat the airflow to heat the food products. By way of another example, the thermal elements may cool the airflow to cool the food products. According to an exemplary embodiment, the temperature regulation unit is a self-contained unit configured to replace a traditional radiant heat lamp light bulb (e.g., emulates the shape and/or size of a traditional radiant heat lamp light bulb, a screw-in replacement, etc.). The temperature regulation unit may have various advantages over a traditional radiant heat lamp light bulb including at least (i) greater durability, (ii) greater operating life, and/or (iii) more accurate control of the thermal output thereof (e.g., by modulating fan speed, modulating current and/or voltage provided to the thermal element, etc.).

According to another exemplary embodiment, a food preparation unit includes a thermal regulation system configured to heat and/or cool food products provided in an open environment (e.g., not in a cabinet, an open rack or shelf, not a closed case, etc.) through a convective heat transfer operation. The temperature regulation system includes a blower, a duct system, and one or more thermal elements. The blower is configured to move an airflow through the duct system. The duct system is configured to direct the airflow to one or more temperature controlled zones. The thermal elements are configured to thermally regulate a temperature of the airflow exiting the duct system to a target temperature to maintain the food products at a desired temperature. By way of example, the thermal elements may heat the airflow to heat the food products. By way of another example, the thermal elements may cool the airflow to cool the food products. In some embodiments, the thermal regulation system includes an airflow control system (e.g., dampers, actuators, etc.) configured to regulate flow characteristics (e.g., a flow rate, etc.) of the airflow through the duct system. In some embodiments, the duct system includes one or more extendable (e.g., telescoping, etc.) components configured to be selectively repositioned towards and away from the temperature controlled zones. In some embodiments, the thermal regulation system includes shades coupled to outlets of the duct system. The shades may be shaped and/or positioned to shape the airflow (e.g., to disperse the airflow over a greater area, etc.). In some embodiments, the thermal regulation system includes a humidifier configured to humidify the thermally-regulated airflow exiting the duct system. In some embodiments, the thermal regulation system includes a controller configured to control operation of at least one of the blower, the thermal elements, the humidifier, the airflow control system, and the extendable components. According to an exemplary embodiment, the controller regulates a temperature of the airflow, a flow rate of the airflow, a temperature of the food products, and a height of the shades above the food product by controlling the blower, the thermal elements, the humidifier, the airflow control system, and/or the extendable components.

According to the exemplary embodiment shown in FIGS. 1-5, a food regulation system, shown as thermal regulation system 10, includes a surround, shown as shade 12, and a food regulation unit (e.g., a convection heat lamp, a radiant heat lamp light bulb replacement unit, a blow ray lamp, etc.), shown as temperature regulation unit 20. According to an exemplary embodiment, the temperature regulation unit 20 is configured to generate and provide thermal energy to heat and/or maintain a temperature of a food product (e.g., a heat lamp for a kitchen, etc.). In other embodiments, the temperature regulation unit 20 is configured to generate and provide thermal energy to heat and/or maintain a temperature in a temperature controlled space (e.g., a heat lamp for a bathroom, a heat lamp for a terrarium, etc.). In alternative embodiments, the temperature regulation unit 20 is configured to additionally or alternatively remove thermal energy to cool a food product and/or cool a temperature controlled space. In one embodiment, the thermal regulation system 10 is a canister lighting system. By way of example, the shade 12 may be a canister and include one or more mounting flanges such that the shade 12 is configured to be recessed within a ceiling, a cabinet, and/or other surfaces. In another embodiment, the thermal regulation system 10 is a heat lamp. By way of example, the shade 12 may be a heat lamp shade. In such embodiments, the thermal regulation system 10 may be selectively repositionable (e.g., with an arm and/or stand assembly, etc.) and/or secured to a surface (e.g., to a ceiling, to a cabinet, hung from the surface, etc.).

As shown in FIG. 1, the shade 12 of the thermal regulation system 10 defines a plurality of apertures, shown as vents 14, and an internal cavity, shown as shade cavity 16. According to an exemplary embodiment, the vents 14 are positioned to provide a flow path for air to flow from an ambient environment into the shade cavity 16. As shown in FIG. 1, the shade cavity 16 of the shade 12 is configured (e.g., shaped, sized, etc.) to receive the temperature regulation unit 20. The shade 12 includes an electrical connector, shown as female electrical connector 18. According to an exemplary embodiment, the female electrical connector 18 is a female light socket.

Figure 2:
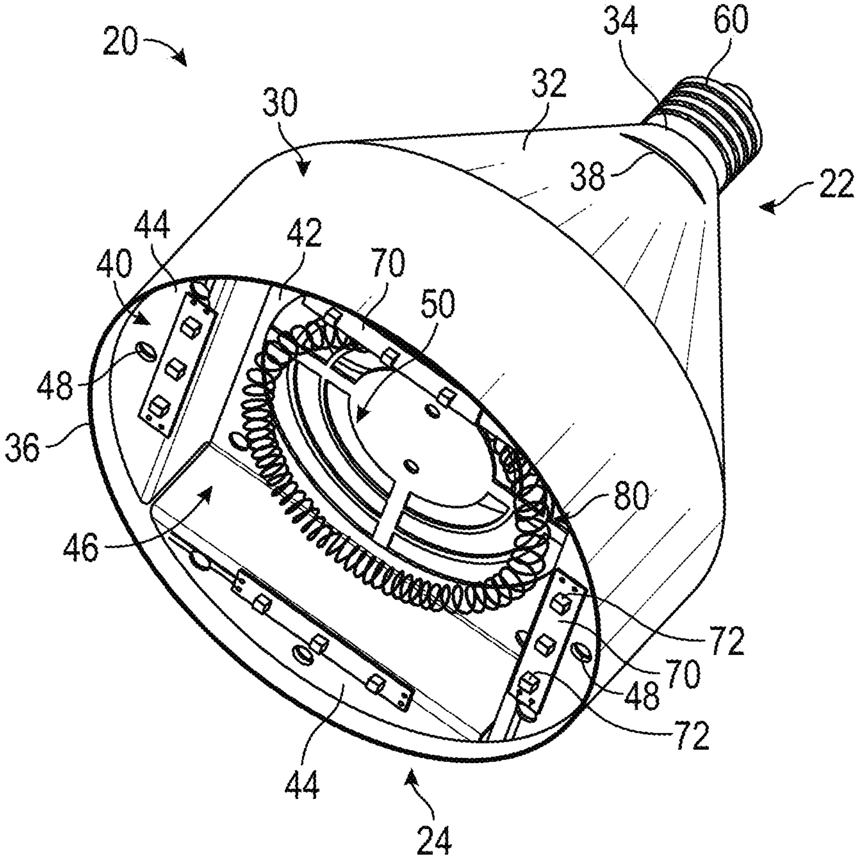
FIG. 2 is a bottom perspective view of the temperature regulation unit of FIG. 1, according to an exemplary embodiment.
Figure 3:
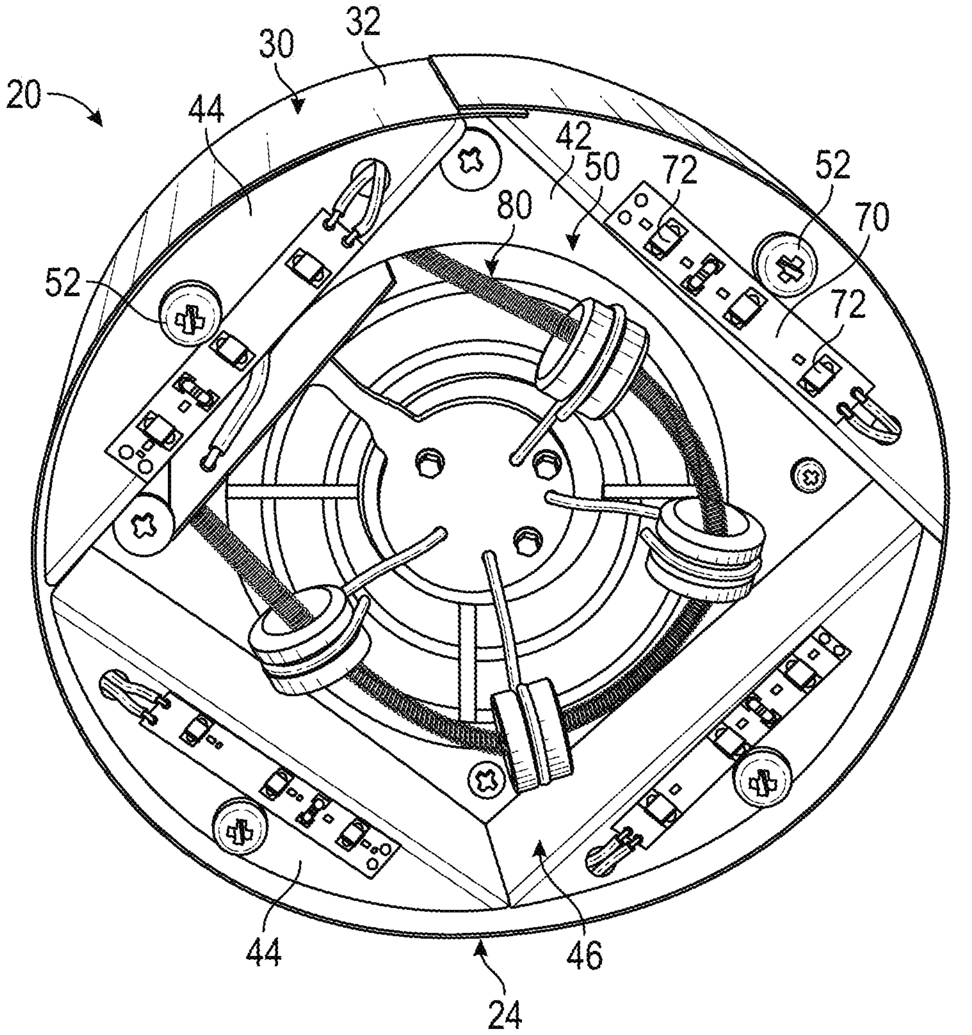
FIG. 3 is a bottom view of the temperature regulation unit of FIG. 1, according to an exemplary embodiments
Figure 4:
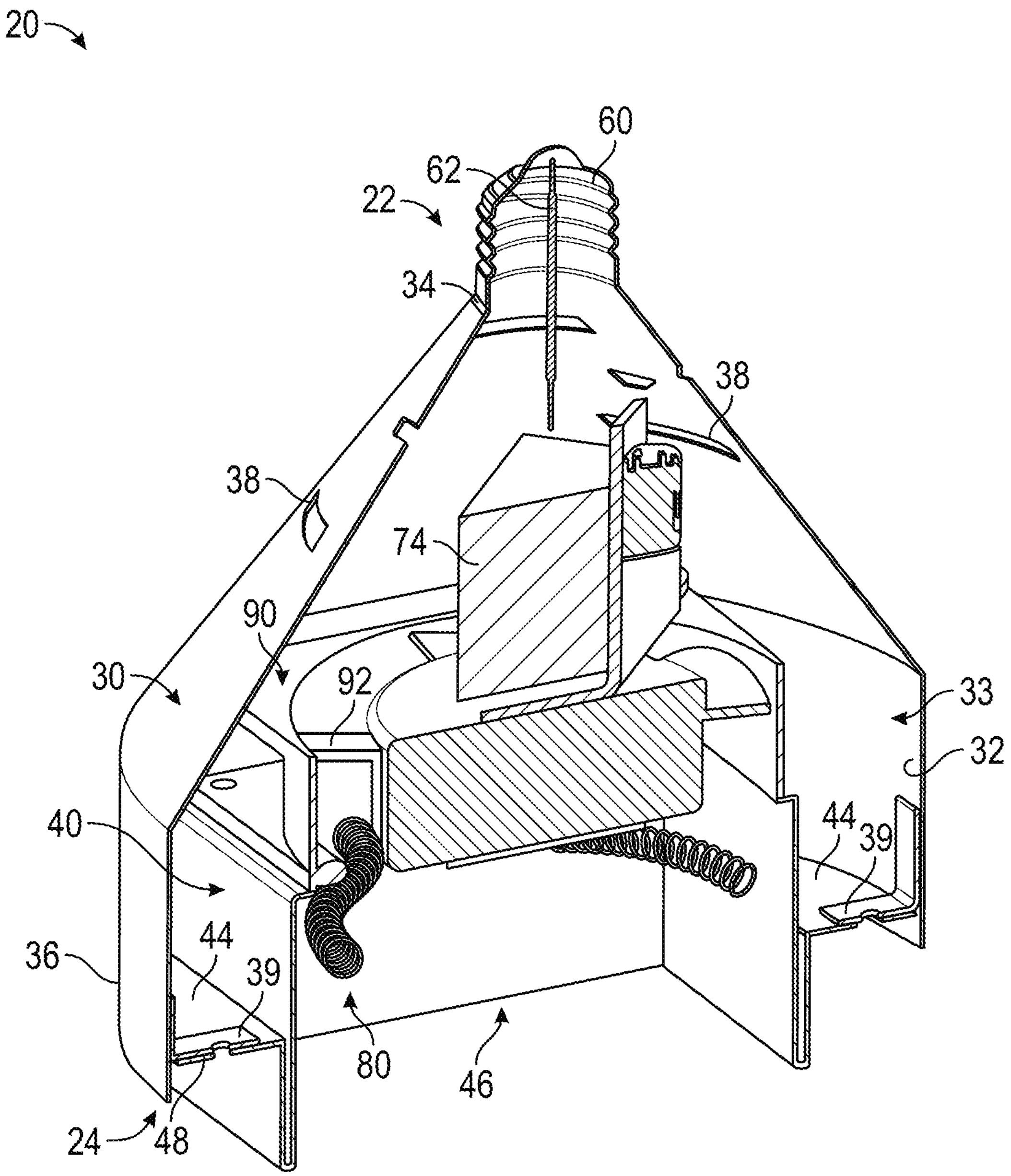
FIG. 4 is a cross-sectional view of the temperature regulation unit of FIG. 1, according to an exemplary embodiment.
Figure 5:
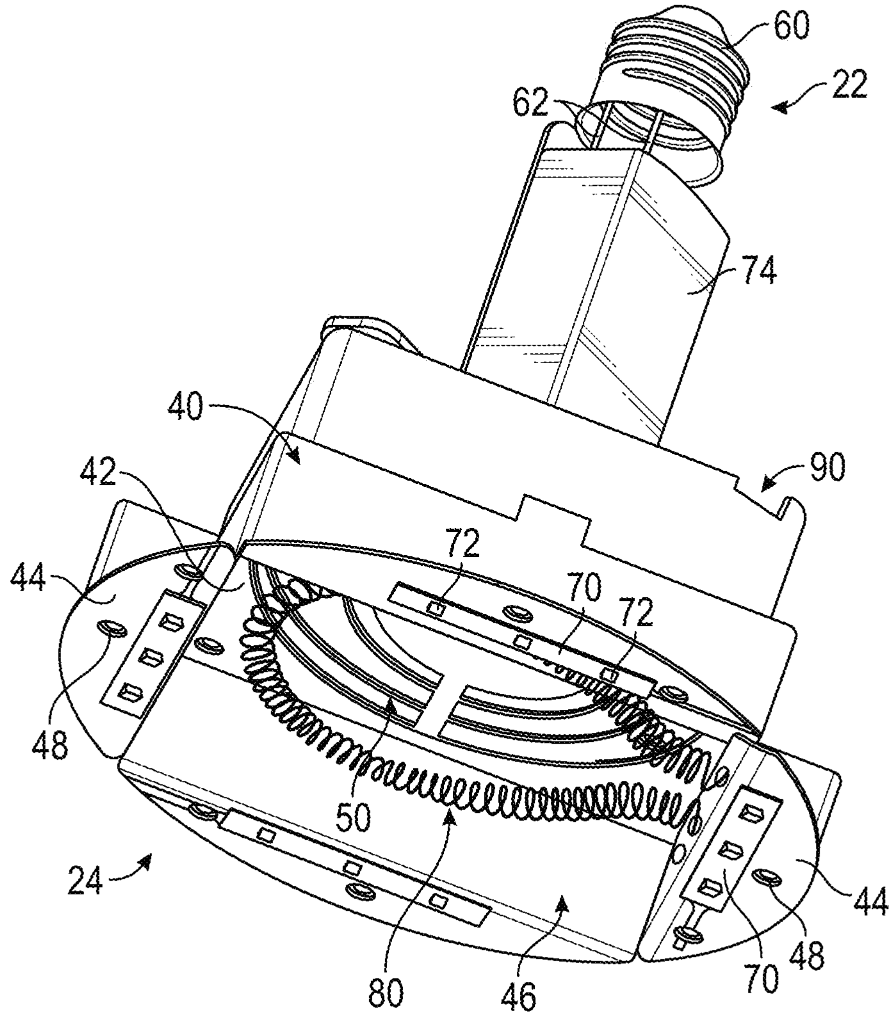
FIG. 5 is a perspective view of internal components of the temperature regulation unit of FIG. 1, according to an exemplary embodiment.

As shown in FIGS. 1-5, the temperature regulation unit 20 includes a housing, shown as shroud 30; a coupler, shown as bracket 40; an electrical connector, shown as male electrical connector 60, a plurality of lighting elements, shown as lighting elements 70; a thermal element, shown as heating element 80; and a driver, shown as fan 90. As shown in FIGS. 1-5, the temperature regulation unit 20 has a first end, shown as upper end 22, and an opposing second end, shown as lower end 24. As shown in FIGS. 1, 2, 4, and 5, the male electrical connector 60 is positioned at the upper end 22 of the temperature regulation unit 20. As shown in FIGS. 4 and 5, the male electrical connector 60 includes wires, shown as electrical wires 62, extending therefrom. According to an exemplary embodiment, the electrical wires 62 electrically couple the male electrical connector 60 to the lighting elements 70, the heating element 80, and/or the fan 90. As shown in FIG. 1, the male electrical connector 60 of the temperature regulation unit 20 is configured to interface with the female electrical connector 18 of the shade 12 to power the lighting elements 70, the heating element 80, and/or the fan 90. According to an exemplary embodiment, the male electrical connector 60 is a male screw thread contact. In some embodiments, the thermal regulation system 10 does not include the shade 12 such that the temperature regulation unit 20 is open to an ambient environment.

As shown in FIGS. 1-4, the shroud 30 has a sidewall, shown as sidewall 32. According to an exemplary embodiment, the sidewall 32 is shaped to correspond with the shape and/or size of a traditional radiant heat lamp light bulb (e.g., has a tapered profile, etc.). In other embodiments, the sidewall 32 is otherwise shaped (e.g., oval-shaped, square, circular, hexagonal, triangular, rectangular, etc.; like an A, B, C, CA, RP, S, F, R, MR, BR, G, PAR, etc. series light bulb; etc.). As shown in FIGS. 1-4, the sidewall 32 defines a first aperture, shown as connector opening 34, positioned at the upper end 22 of the shroud 30 and an opposing second aperture, shown as airflow outlet 36, positioned at the lower end 24 of the shroud 30. The connector opening 34 is configured to receive the male electrical connector 60 such that the male electrical connector 60 extends from the shroud 30. As shown in FIG. 4, the sidewall 32 of the shroud 30 defines an internal cavity, shown as shroud cavity 33. As shown in FIGS. 1, 2, and 4, the sidewall 32 defines a plurality of apertures, shown as vents 38. According to an exemplary embodiment, the vents 38 are positioned to provide a flow path for air to flow from the shade cavity 16 and/or an ambient environment into the shroud cavity 33. As shown in FIG. 4, the shroud 30 includes a plurality of interfaces, shown as coupling interfaces 39, positioned around the periphery of the sidewall 32 proximate the airflow outlet 36.

As shown in FIGS. 2-5, the bracket 40 includes a plate, shown as plate 42, and a plurality of flanges, shown as flanges 44, extending therefrom. As shown in FIGS. 2-5, the plate 42 and the flanges 44 cooperatively define a recess, shown as thermal recess 46, configured to receive the heating element 80. As shown in FIGS. 4 and 5, the fan 90 and the heating element 80 are positioned on opposing sides of the plate 42. In other embodiments, both the fan 90 and the heating element 80 are positioned on the same side of the plate 42 (e.g., within the shroud cavity 33, etc.). As shown in FIGS. 2, 3, and 5, the lighting elements 70 are disposed along the flanges 44 of the bracket 40. The lighting elements 70 include a plurality of lights, shown as lights 72. The lighting elements 70 may be configured to illuminate a target area, illuminate a target environment, illuminate a food product, and/or provide decorative lighting to enhance the aesthetics of the temperature regulation unit 20. The lights 72 may include light bulbs, light emitting diodes (LEDs), or still other lighting devices. According to an exemplary embodiment, the lights 72 include LEDs. As shown in FIGS. 4 and 5, the lighting elements 70 include a driver, shown as light driver 74, positioned on a first side of the fan 90 with the heating element 80 positioned on a second side of the fan 90 (e.g., the light driver 74 may be positioned upstream relative to the fan 90, and the heating element 80 may be positioned along a flow path within which the fan 90 provides an airflow, etc.). Positioning the light driver 74 as shown in FIGS. 4 and 5 may cool the light driver 74 and pre-heat the airflow (e.g., due to heat generated by the light driver 74, etc.) provided to the heating element 80. According to an exemplary embodiment, the light driver 74 is configured to control an amount of current and/or voltage provided to the lights 72.

As shown in FIGS. 2, 4, and 5, the flanges 44 define a plurality of interfaces, shown as coupling interfaces 48. As shown in FIG. 4, the coupling interfaces 48 of the bracket 40 are positioned to align with the coupling interfaces 39 of the shroud 30. According to the exemplary embodiment shown in FIG. 3, the bracket 40 is releasably secured to the shroud 30 with a plurality of fasteners (e.g., screws, etc.), shown as fasteners 52. The fasteners 52 extend through the coupling interfaces 48 of the bracket 40 and the coupling interfaces 39 of the shroud 30 to secure the bracket 40 to the shroud 30, according to an exemplary embodiment. The bracket 40, the lighting elements 70, the light driver 74, the heating element 80, and the fan 90 are thereby positioned within the shroud cavity 33 of the shroud 30. As shown in FIGS. 2, 3, and 5, the plate 42 defines an aperture, shown as airflow aperture 50. According to an exemplary embodiment, the airflow aperture 50 is positioned to provide a flow path for air to flow from within the shroud cavity 33 and out through the airflow outlet 36 into an ambient environment.

As shown in FIG. 4, the fan 90 includes a blade, shown as fan blade 92. According to an exemplary embodiment, the fan 90 is configured rotate the fan blade 92 to move or drive a fluid to produce an airflow (e.g., humidified air, hot air, cool air, ambient air, etc.) through the shroud 30. In one embodiment, the fan 90 is a variable speed fan. In another embodiment, the fan 90 is a fixed speed fan. According to an exemplary embodiment, the fan 90 is configured to draw air from an ambient environment, through the vents 14 and/or the vents 38, into the shroud cavity 33, and force the air out through the airflow aperture 50 of the bracket 40 and the airflow outlet 36 of the shroud 30. In still other embodiments, the temperature regulation unit 20 includes another type of driver (e.g., an air multiplier, etc.).

According to an exemplary embodiment, the shade 12 and/or the shroud 30 are shaped to control the airflow (e.g., to disperse the airflow over a greater area of a temperature controlled zones such that the airflow is not directed and/or concentrated on a small area, to aid in evenly regulating the temperature of food products, to focus the airflow, etc.). The shade 12 and/or the shroud 30 may be configured to direct the airflow to a desired location (e.g., to a food product for heating and/or cooling purposes, a temperature controlled zone, etc.). The shade 12 and/or the shroud 30 may have a decorative and/or aesthetically-appealing shape and/or appearance.

According to an exemplary embodiment, the heating element 80 includes a resistive heating element configured to perform at least a portion of the heating operation of the temperature regulation unit 20. The resistive heating element may receive electrical current (i.e., electrical energy) that is passed through a coil of the heating element 80 to generate heat (e.g., thermal energy, etc.), which is transferred to the airflow produced by the fan 90 to generate a thermally-regulated airflow. In some embodiments, the heating element 80 receives a heated working fluid as part of the heating operation (e.g., due to heat from the light driver 74, etc.). In other embodiments, the heating element 80 includes a different type of heating element (e.g., an induction heating element, etc.).

According to an alternative embodiment, the thermal element additionally or alternatively includes a cooling element (e.g., in place of or in combination with a heating element, etc.). For example, the thermal element may be or include a refrigerant coil that is used in a refrigeration cycle to perform a cooling operation on the airflow produced by the fan 90. By way of example, a refrigerant coil may be used along with a working fluid (e.g., a refrigerant such as R-134a, etc.) in a refrigeration cycle. The working fluid flows through the refrigerant coil and absorbs thermal energy (e.g., through evaporation, etc.) from the airflow to cool the airflow, a food product, and/or a temperature-controlled zone, reducing the temperatures thereof. The absorbed thermal energy (e.g., heat, etc.) is rejected into the surrounding environment (e.g., room, air, etc.) or ejected from the building through the remaining steps in the refrigeration cycle (e.g., compression, condensation, expansion, etc.). In other embodiments, the cooling element includes another type of cooling element (e.g., a thermoelectric cooler, etc.).

According to an exemplary embodiment, the heating element 80 is configured to provide thermal energy to the airflow (e.g., to heat the airflow, etc.) as the airflow flows over the heating element 80 to perform a heating operation. By way of example, the heating element 80 may be positioned to thermally regulate a temperature of the airflow flowing through the airflow aperture 50 to a target temperature. As shown in FIGS. 2-5, the heating element 80 is positioned within the thermal recess 46 of the bracket 40 proximate (e.g., at, adjacent, near, etc.) the airflow outlet 36 of the shroud 30. A thermally-regulated airflow may exit the airflow outlet 36. The temperature regulation unit 20 may thereby thermally regulate the temperature of a food product and/or area within a temperature controlled zone below the airflow outlet 36 with the thermally-regulated airflow (e.g., by way of convective heat transfer, etc.).

According to the exemplary embodiment shown in FIGS. 4 and 5, the light driver 74 is positioned upstream of the fan 90 and the heating element 80 is positioned downstream of the fan 90 (e.g., the fan 90 draws air across the light driver 74 and blows air across the heating element 80, etc.). The light driver 74 is thereby positioned to facilitate operating the light driver 74 at a lower temperature (e.g., the heat generated by the heating element 80 does not heat the light driver 74, etc.), extending the operational life thereof. The light driver 74 is additionally or alternatively positioned to facilitate preheating the airflow as the airflow passes over the light driver 74, while reducing the operating temperature of the light driver 74, extending the operational life thereof. In other embodiments, the fan 90 is positioned upstream of the light driver 74, and the heating element 80 is positioned downstream of the light driver 74 (e.g., the fan 90 blows air over the light driver 74 and the heating element 80, etc.). In still other embodiments, the light driver 74 is positioned upstream of the heating element 80, and the fan 90 is positioned downstream of the heating element 80 (e.g., the fan 90 pulls air across both the light driver 74 and the heating element 80, etc.). A shield (e.g., a reflector, etc.) may be positioned between the heating element 80 and the light driver 74 (e.g., to isolate the light driver 74 from the heat of the heating element 80, etc.). According to an exemplary embodiment, the temperature regulation unit 20 (e.g., the lighting elements 70, the heating element 80, the fan 90, etc.) operates at approximately 120 Volts, 504 Watts, and 4.2 Amps.

In some embodiments, the temperature regulation unit 20 includes one or more humidifiers positioned within the shroud 30. According to an exemplary embodiment, the one or more humidifiers are configured to humidify the thermally-regulated airflow such that the thermally-regulated airflow does not dry out a food product being heated and/or cooled by the temperature regulation unit 20.

According to an exemplary embodiment, the temperature regulation unit 20 provides various advantages relative to radiative heating light bulbs. By way of example, radiative heating light bulbs may be fragile (e.g., as they may be made of glass, etc.) and have a relatively short operating life (e.g., one to three years, etc.). The temperature regulation unit 20 may have greater durability (e.g., the shroud 30 may be made of metal, plastic, etc.) and have a greater operating life (e.g., ten, twenty, thirty, etc. years). By way of example, the heating element 80 may have a greater operating life than a heating element (i.e., a light bulb filament) of a radiative heating light bulb. By way of another example, the lights 72 (e.g., LEDs, etc.) may have a greater operating life than a light source (i.e., a light bulb filament) of a radiative heating light bulb. By way of yet another example, the temperature regulation unit 20 may facilitate easier and more accurate control of the temperature of a food product and/or a target area relative to traditional radiative heating light bulb (e.g., by modulating a speed of the fan, modulating current and/or voltage provided to the heating element 80, etc.).

Figure 6:
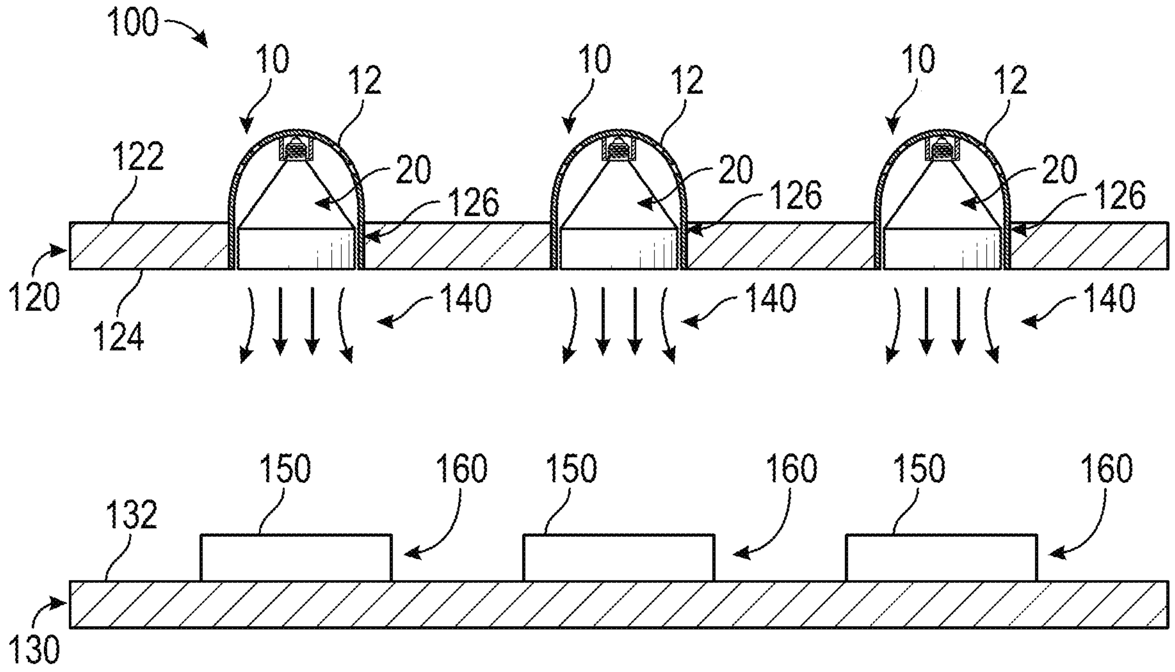
FIG. 6 is a front view of a food preparation system, according to an exemplary embodiment.
Figure 7:
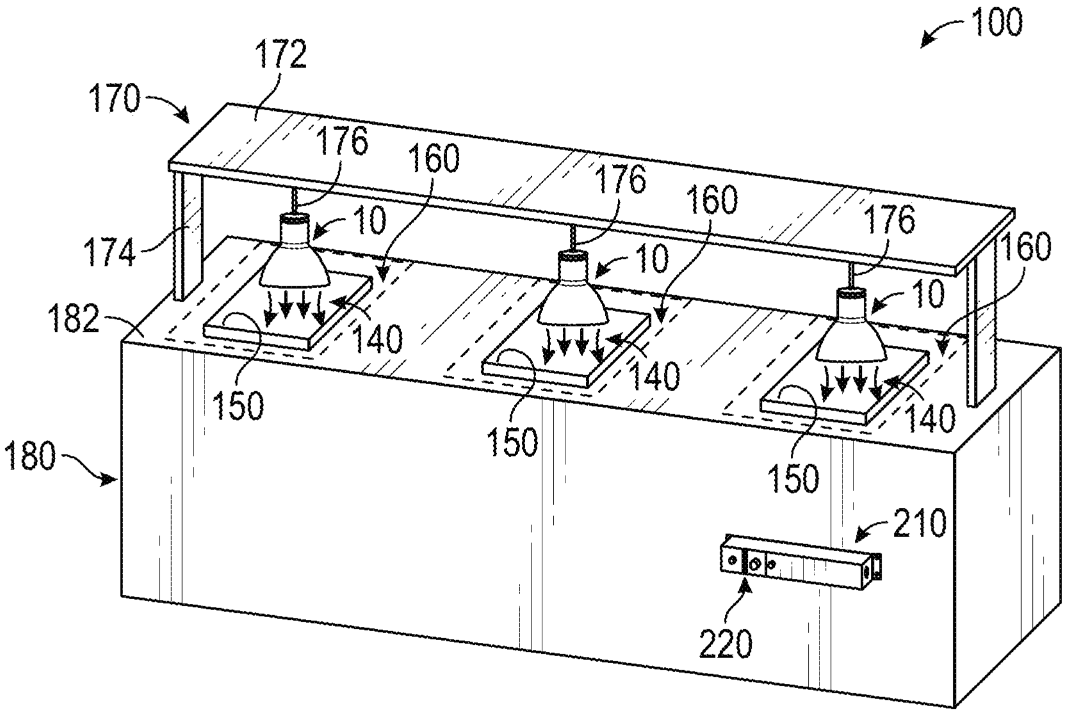
FIG. 7 is a perspective view a food preparation system, according to another exemplary embodiment.

Referring now to FIGS. 6 and 7, a food preparation system, shown as food preparation unit 100, is shown according to various exemplary embodiments. As shown in FIGS. 6 and 7, the food preparation unit 100 includes a plurality of thermal regulation systems 10. According to the exemplary embodiment shown in FIG. 6, the thermal regulation systems 10 are positioned at least partially above a ceiling, shown as ceiling 120 (e.g., a recessed heating lamp, etc.). As shown in FIG. 6, the ceiling 120 includes a first surface, shown as enclosed side 122, and an opposing second surface, shown as open side 124. As shown in FIG. 6, the ceiling 120 defines a plurality of apertures, shown as through-holes 126, positioned to correspond with (e.g., the location of, the size of, etc.) and receive each of the thermal regulation systems 10. According to the exemplary embodiment shown in FIG. 6, a majority of each of the thermal regulation systems 10 is positioned above the enclosed side 122 of the ceiling 120 such that the majority of each of the thermal regulation systems 10 is not visible. In alternative embodiments, the thermal regulation systems 10 extend from (e.g., hang from, etc.) the open side 124 of the ceiling 120. In other embodiments, the thermal regulation systems 10 are at least partially positioned within and/or extend from a cabinet, a soffit, or another installation location.

As shown in FIG. 6, the thermal regulation systems 10 are configured to provide a thermally-regulated airflow 140 into an open environment (e.g., within a kitchen, etc.) towards a surface, shown as surface 132, of a counter (e.g., table, island, heating surface, etc.), shown as counter 130. As shown in FIG. 6, the surface 132 provides a surface configured to receive and support one or more products (e.g., a plate, a food product, a drink, etc.), shown as products 150. The products 150 may thereafter be heated and/or cooled by the thermally-regulated airflows 140 provided by the thermal regulation systems 10 during a heating operation and/or a cooling operation. The products 150 may be positioned beneath each of the thermal regulation systems 10 within a region, shown as temperature controlled zones 160. The temperature controlled zones 160 may be at least partially defined by the surface 132. According to an exemplary embodiment, the thermal energy provided by the thermally-regulated airflows 140 of the thermal regulation systems 10 maintain a target temperature (or target temperature range) of the products 150 within the temperature controlled zones 160 (e.g., to provide a desired eating experience, to comply with food safety regulations, etc.). In some embodiments, the temperature of the thermally-regulated airflows 140 is varied from one temperature controlled zone 160 to the next to provide varying amounts of thermal energy across the temperature controlled zones 160 (e.g., different temperatures between the temperature controlled zones 160, etc.).

In some embodiments, the surface 132 absorbs and retains thermal energy provided by the thermally-regulated airflows 140 of the thermal regulation systems 10 such that the products 150 within the temperature controlled zones 160 may be further temperature controlled with conductive heat transfer. By way of example, the surface 132 may be stone or another thermally-retentive material. Thus, the thermal regulation systems 10 may provide thermal energy to the products 150 within the temperature controlled zones 160 through convective heat transfer, conductive heat transfer, radiative heat transfer, or a combination thereof.

According to the exemplary embodiment shown in FIG. 7, the thermal regulation systems 10 are mounted to (e.g., attached to, coupled to, hung from, etc.) a shelf unit, shown as shelf unit 170. As shown in FIG. 7, the shelf unit 170 includes a shelf, shown as shelf 172, and legs, shown as stands 174. As shown in FIG. 7, the shelf unit 170 includes a plurality of supports, shown as cords 176, extending therefrom into an open environment (e.g., below the shelf unit 170, etc.). The cords 176 are configured to facilitate hanging the thermal regulation systems 10 from the shelf 172 and/or powering the thermal regulation systems 10.

As shown in FIG. 7, the shelf unit 170 is disposed on top of a base, shown as base 180. According to an exemplary embodiment, the stands 174 are sized to position the airflow outlets 36 of thermal regulation systems 10 a target distance above the base 180. In other embodiments, the stands 174 are adjustable to facilitate selectively repositioning the shelf 172 and/or the airflow outlets 36 of thermal regulation systems 10 a desired distance from the base 180. The stands 174 may be rectangular, square, tubular, etc. and configured to conceal electrical wiring connected to the thermal regulation systems 10. According to the exemplary embodiment shown in FIG. 7, the stands 174 are fixed to the base 180. In some embodiments, the entire food preparation unit 100 is selectively repositionable (e.g., the base 180 includes wheels, etc.). According to alternative embodiments, the stands 174 are not coupled to the base 180 (e.g., the shelf unit 170 is not fixed to the base 180, the shelf unit 170 is repositionable, etc.).

According to alternative embodiments, the food preparation unit 100 does not include the shelf 172, and a stand 174 is directly coupled to each of the thermal regulation systems 10. In one embodiment, the stands 174 are directly coupled to the thermal regulation systems 10 and not adjustable (i.e., have a fixed length to position the thermal regulation systems 10 a target distance from the base 180). In other embodiments, the stands 174 are directly coupled to the thermal regulation systems 10 and are adjustable. In some embodiments, the stands 174 are structured as "C-leg" stands (e.g., C-shaped, etc.) or "T-leg" stands (e.g., T-shaped, etc.) and configured to facilitate installation and stability of the thermal regulation systems 10 onto any surface (e.g., a counter, a table, etc.).

As shown in FIG. 7, the base 180 provides a surface, shown as surface 182, configured to receive and support the products 150. The products 150 may thereafter be heated and/or cooled by the thermally-regulated airflows 140 provided by the thermal regulation systems 10 during a heating operation and/or a cooling operation. As shown in FIG. 7, the surface 182 is substantially rectangular in shape. In other embodiments, the surface 182 has a different shape (e.g., oval-shaped, square, circular, hexagonal, etc.). As shown in FIG. 7, the surface 182 is substantially flat. In other embodiments, the surface 182 is not flat (e.g., curved, etc.). By way of example, the surface 182 may define one or more depressions (e.g., grooves, indents, valleys, etc.) positioned along the base 180. The depressions may allow a user (e.g., chef, cook, staff, owner, etc.) to separate or arrange various items (e.g., hot and cold items, solid and liquid items, align sandwiches or ice cream bars, etc.). For example, one depression may receive a liquid based food product (e.g., soup, etc.) and another depression may receive a solid based food product (e.g., sandwiches, pasta, etc.). In one embodiment, one depression and/or section of the surface 182 is heated while another depression and/or section is cooled. In yet another embodiment, the surface 182 absorbs and retains thermal energy provided by the thermally-regulated airflow 140 of the thermal regulation systems 10 such that the products 150 within the temperature controlled zones 160 may be further temperature controlled with conductive heat transfer. Thus, the thermal regulation systems 10 may provide thermal energy to the products 150 within the temperature controlled zones 160 through convective heat transfer, conductive heat transfer, radiative heat transfer, or a combination thereof.

Figure 8:
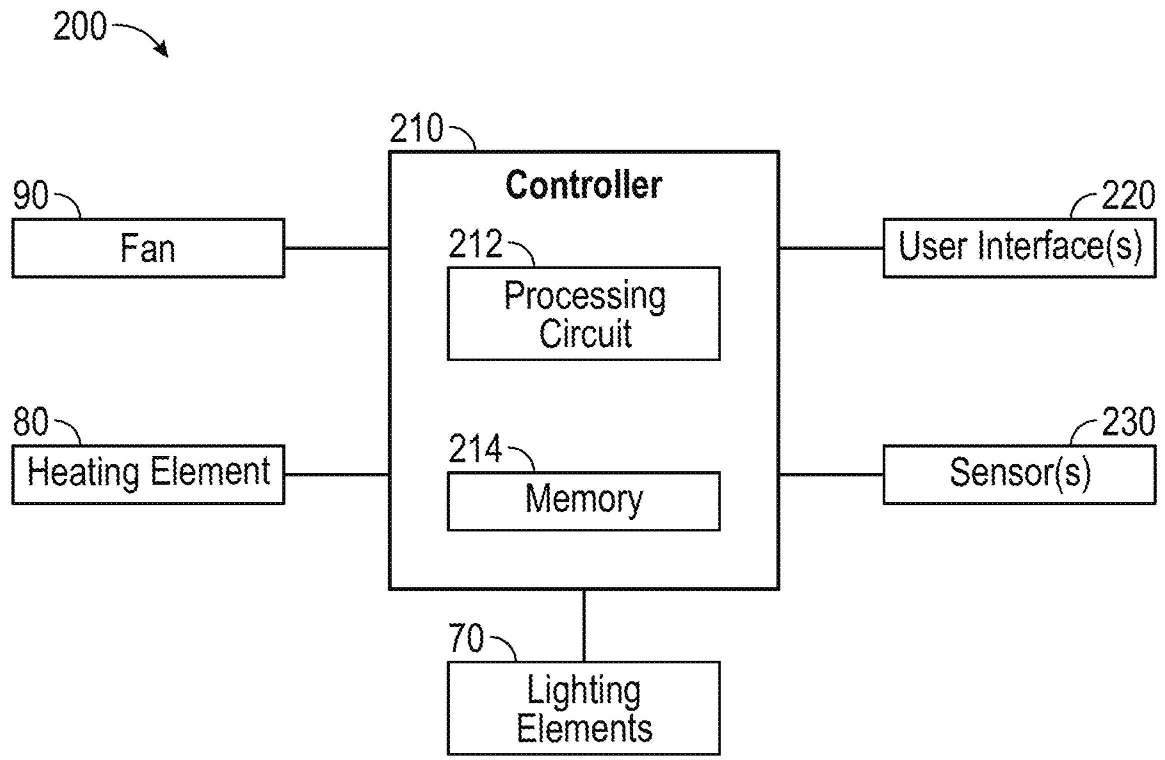
FIG. 8 is a schematic block diagram of a controller for a temperature regulation unit and/or a food preparation system, according to an exemplary embodiment.

According to the exemplary embodiment shown in FIG. 8, a control system 200 for a food preparation unit (e.g., the thermal regulation systems 10, the food preparation unit 100, etc.) includes a controller 210. In one embodiment, the controller 210 is configured to selectively engage, selectively disengage, control, and/or otherwise communicate with components of the thermal regulation systems 10. As shown in FIG. 8, the controller 210 is coupled to the lighting elements 70, the heating element 80 (and/or cooling element), and/or the fan 90 of each of the thermal regulation systems 10, a user interface 220, and one or more sensors 230.

The controller 210 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 8, the controller 210 includes a processing circuit 212 and a memory 214. The processing circuit 212 may include an ASIC, one or more FPGAs, a DSP, circuits containing one or more processing components, circuitry for supporting a microprocessor, a group of processing components, or other suitable electronic processing components. In some embodiments, the processing circuit 212 is configured to execute computer code stored in the memory 214 to facilitate the activities described herein. The memory 214 may be any volatile or non-volatile computer-readable storage medium capable of storing data or computer code relating to the activities described herein. According to an exemplary embodiment, the memory 214 includes computer code modules (e.g., executable code, object code, source code, script code, machine code, etc.) configured for execution by the processing circuit 212. In some embodiments, the controller 210 may represent a collection of processing devices (e.g., servers, data centers, etc.). In such cases, the processing circuit 212 represents the collective processors of the devices, and the memory 214 represents the collective storage devices of the devices.

According to an exemplary embodiment, the controller 210 is configured to control the thermal regulation systems 10. In one embodiment, a user may control the thermal regulation system 10 with the user interface 220. The controller 210 may be communicably coupled to various components of the thermal regulation systems 10 and/or the food preparation unit 100 (e.g., the lighting elements 70, the heating elements 80, the fans 90, the cooling elements, the user interface 220, the sensors 230, the humidifier, etc.) such that information or signals (e.g., command signals, etc.) may be provided to and/or from the controller 210. The information or signals may relate to one or more components of the thermal regulation systems 10. According to the exemplary embodiment shown in FIG. 7, the controller 210 is located remotely relative to the thermal regulation systems 10. In other embodiments, the controller 210 is directly coupled to a portion of the thermal regulation systems 10 (e.g., the shade 12, the shroud 30, etc.). In still other embodiments, the controller 210 is provided by a web-based or wireless system that is communicably coupled to the thermal regulation systems 10 (e.g., an Internet connected temperature regulation unit, a near field communication temperature regulation unit, with a mobile application, etc.).

According to an exemplary embodiment, the user interface 220 facilitates communication between an operator (e.g., a cook, a chef, a staff member, etc.) of the thermal regulation systems 10 and one or more components of the thermal regulation systems 10. By way of example, the user interface 220 may include at least one of an interactive display, a touchscreen device, one or more buttons (e.g., a stop button configured to turn the unit off, buttons allowing a user to set a target temperature, etc.), switches, and the like. In one embodiment, the user interface 220 includes a notification device (e.g., alarm, light, display, etc.) that notifies the operator when the lighting elements 70, the heating elements 80, the cooling elements, the fan 90, and/or the humidifier are on, off, in a standby mode, in a heating mode, and/or in a cooling mode. According to an exemplary embodiment, a user may interact with the user interface 220 to turn the thermal regulation systems 10 on or off. According to another exemplary embodiment, a user may interact with the user interface 220 to enter a desired operating set point (e.g., an operating power level, an operating temperature, etc.) and/or increase or decrease the operating set point for the heating mode of operation and/or the cooling mode of operation of the thermal regulation systems 10. In another embodiment, a display shows a current temperature of the heating elements 80, the cooling elements, a current temperature of the thermally-regulated airflow 140, a current temperature of the temperature controlled zones 160, a target temperature (e.g., of the temperature controlled zone 160, of the products 150, of the heating elements 80, of the thermally-regulated airflow 140, etc.), and/or a time until the target temperature is reached.

In one embodiment, the sensors 230 are positioned to monitor the temperature controlled zones 160 for the presence of the products 150. In some embodiments, the sensors 230 include an infrared sensor. In another embodiment, the sensors 230 include an LED with a phototransistor. In other embodiments, the sensors 230 include another type of sensor capable of monitoring the temperature controlled zone 160 for the presence of products 150 (e.g., a scale, etc.). In some embodiments, the sensors 230 are configured to monitor the temperature of the temperature controlled zones 160, the products 150, the thermally-regulated airflow 140, the cooling elements, and/or the heating elements 80. According to an alternative embodiment, one or more of the sensors 230 include temperature sensors positioned to monitor the temperature of the products 150, the temperature controlled zones 160, and/or the heating elements 80. The sensors 230 may include infrared temperature sensors, probes, or still other devices. The sensors 230 may be positioned within the shade 12, within the shroud 30, with a shelf or hood above the temperature controlled zone 160, at or within a surface of the food preparation unit 100, within a wrapper or box of the product 150, etc.

According to an exemplary embodiment, the controller 210 is configured to control at least one of the lighting elements 70, the heating elements 80, the cooling elements, the fan 90, and the humidifier based on inputs received from an operator using the user interface 220. By way of example, an operator may provide an input to engage or disengage the fan 90 to modulate the airflow characteristics of the thermally-regulated airflows 140 exiting the thermal regulation systems 10. By way of another example, an operator may provide an input to turn on or off various components of the thermal regulation systems 10 (e.g., the lighting elements 70, the heating elements 80, the fans 90, etc.).

According to an exemplary embodiment, the controller 210 is configured to control at least one of the lighting elements 70, the heating elements 80, the cooling elements, the fan 90, and the humidifier in response to readings from the sensors 230 and/or inputs received by an operator with the user interface 220. By way of example, an operator may provide an input for a desired temperature of a product 150. The controller 210 may adaptively control (i) the speed of the fan blades 92 of the fans 90 to modulate the flow rate of the thermally-regulated airflow 140 out of the thermal regulation systems 10, (ii) the temperature of the heating elements 80 (e.g., by controlling the current and/or voltage provided to the heating elements 80, etc.), and/or (iii) the temperature of the cooling elements to maintain the desired temperature of the products 150 (e.g., within each respective temperature controlled zone 160, etc.).

According to the exemplary embodiment shown in FIGS. 9-14, a thermal regulation unit, shown as food preparation unit 310, includes a thermal regulation assembly, shown as temperature regulation system 400. According to an exemplary embodiment, the temperature regulation system 400 is configured to generate and provide thermal energy to heat a food product. In other embodiments, the temperature regulation system 400 additionally or alternatively removes thermal energy to cool a food product. As shown in FIGS. 9-12, the temperature regulation system 400 includes a driver (e.g., a fan, a centrifugal fan, an air pump, etc.), shown as blower 410, and a conduit system, shown as duct system 420. As shown in FIGS. 9-12, the blower 410 is configured to move or drive a fluid to produce an airflow 412 (e.g., humidified air, hot air, cool air, ambient air, etc.) through the duct system 420. In one embodiment, the blower 410 is a fixed speed blower. In another embodiment, the blower 410 is a variable speed blower. According to an exemplary embodiment, the duct system 420 is configured to receive the airflow 412 provided by the blower 410 and direct the airflow 412 to a desired location (e.g., to a food product for heating and/or cooling purposes, a temperature controlled zone, etc.).

As shown in FIGS. 9-12, the duct system 420 includes one or more extension conduits, shown as connecting tubes 422, a plurality of elbow conduits, shown as elbow tubes 424, and a corresponding number of down conduits, shown down tubes 426. According to an exemplary embodiment, the connecting tubes 422 are sized to space each of the down tubes 426 a target distance apart. The target distance may be uniform or non-uniform (e.g., varied, etc.) between subsequent down tubes 426. According to the exemplary embodiments shown in FIGS. 9-12, the duct system 420 is arranged in a series configuration (e.g., a series of connecting tubes 422, elbow tubes 424, and down tubes 426, etc.). In the series configuration, a single connecting tube 422 may extend from the blower 410. The airflow 412 may be subsequently distributed across the down tubes 426 by the duct system 420. As shown in FIGS. 9-12, the elbow tubes 424 are positioned and structured to direct the airflow 412 to at least one of a subsequent connecting tube 422 and a respective one of the down tubes 426. The elbow tubes 424 may thereby include one or more apertures or channels that allow the airflow 412 to at least partially flow from a first connecting tube 422 to a second connecting tube 422 and from the first connecting tube 422 to a respective down tube 426. The airflow 412 may thereby travel along one path with portions of the airflow 412 diverging (e.g., splitting off, separating, etc.) at each of the elbow tubes 424 to enter the respective down tubes 426.

In other embodiments, the duct system 420 is arranged in a parallel configuration. In one embodiment, the duct system 420 includes a plurality of connecting tubes 422 extending from the blower 410 when arranged in the parallel configuration. For example, the duct system 420 may include a splitter element (e.g., a manifold, etc.) that connects the blower 410 to a plurality of connecting tubes 422 such that the airflow 412 splits into a plurality of parallel airflows 412. In another embodiment, the temperature regulation system 400 includes a plurality of blowers 410. A single connecting tube 422, elbow tube 424, and/or down tube 426 of the duct system 420 may extend from each of the plurality of blowers 410 when arranged in the parallel configuration (e.g., each of the connecting tubes 422, elbow tubes 424, and/or down tubes 426 may be coupled to an independent blower 410, etc.). In some embodiments, the duct system 420 does not include the connecting tube 422 and/or the elbow tube 424. By way of example, the down tube 426 may extend directly from the blower 410. In such an arrangement, the airflow 412 flowing through the down tube 426 is independently driven by the blower 410. Thus, a plurality of down tubes 426 may be variously positioned with the airflow 412 through each being independently driven by a respective blower 410.

Figure 11:
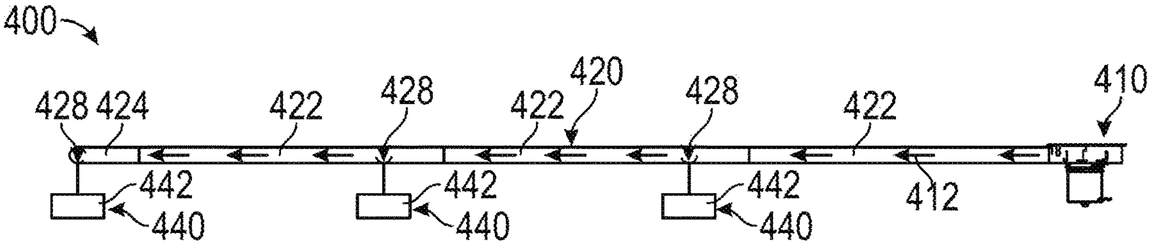
FIGS. 11 and 12 are plan and perspective views of a temperature regulation system, according to various exemplary embodiments.
Figure 12:
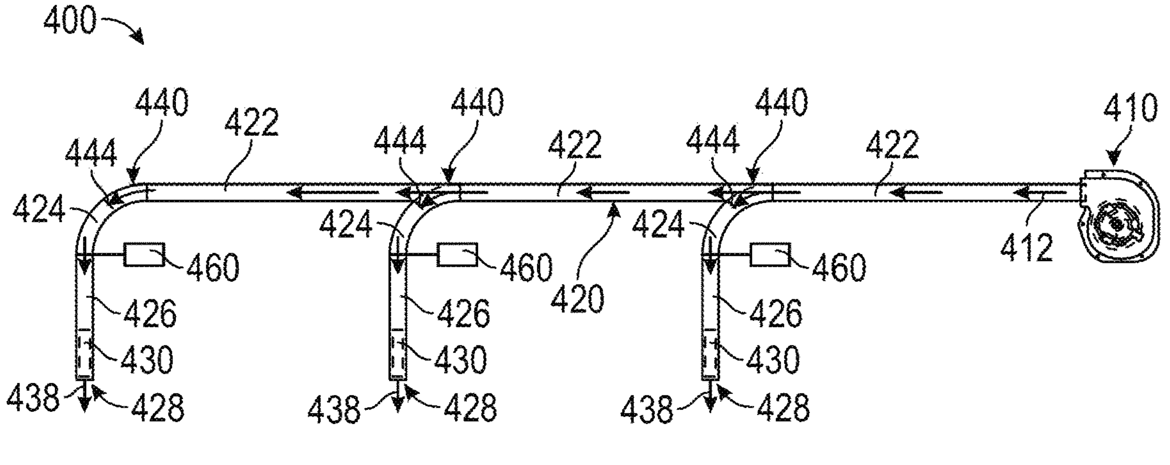
Figure 13:
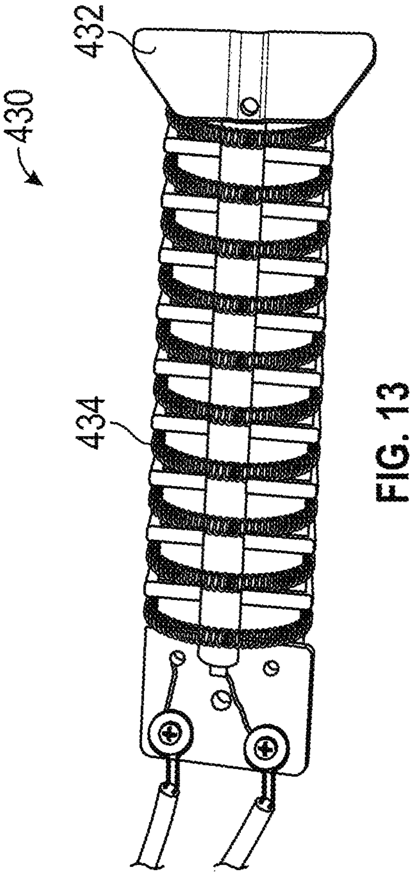
FIGS. 13 and 14 are various views of a thermal element of a temperature regulation system, according to an exemplary embodiment.
Figure 14:
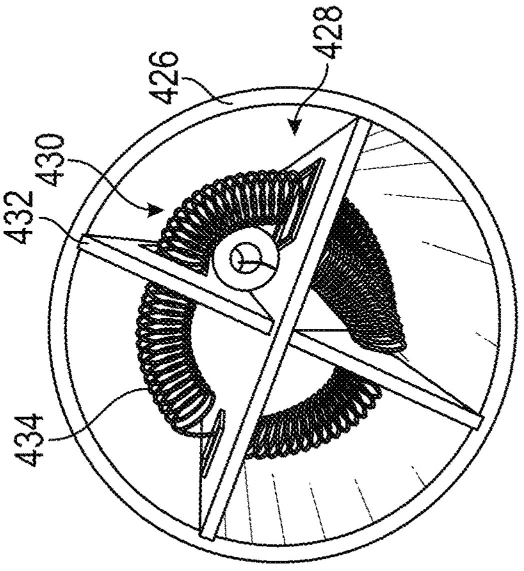

As shown in FIGS. 9-15, the temperature regulation system 400 includes one or more thermal elements, shown as heating elements 430. In other embodiments, the thermal elements additionally or alternatively include cooling elements (e.g., an evaporator tube, a thermoelectric cooler, etc.). As shown in FIGS. 13 and 14, the heating elements 430 each include a body, shown as heating element body 432, and a thermal member, shown as coil 434. In one embodiment, the coil 434 is wrapped around the heating element body 432. In other embodiments, the coil 434 is otherwise coupled to the heating element body 432. According to an exemplary embodiment, the heating element body 432 is manufactured from mica. In other embodiments, the heating element body 432 is manufactured from another material (e.g., stainless steel, a ceramic material, etc.). According to an exemplary embodiment, the heating elements 430 each have a maximum power output of 500 Watts ("W"). In other embodiments, the heating elements 430 each have another maximum power output (e.g., 250 W, 750 W, etc.).

According to an exemplary embodiment, the coils 434 of the heating elements 430 are configured to provide thermal energy to the airflow 412 (e.g., to heat the airflow 412, etc.) as the airflow 412 flows over the heating elements 430 to perform a heating operation to thermally regulate a temperature of the airflow 412 to a target temperature. As shown in FIGS. 9-12 and 14, one heating element 430 is positioned within each of the down tubes 426 proximate (e.g., at, adjacent, near, etc.) an outlet, shown as airflow outlet 428, thereof. Thus, a thermally-regulated airflow, shown as thermally-regulated airflow 438, exits each of the airflow outlets 428. The temperature regulation system 400 may thereby thermally regulate the temperature of a food product within a temperature controlled zone below the airflow outlets 428 with the thermally-regulated airflow 438 (e.g., by way of convective heat transfer, etc.). The heating elements 430 extend along a length of the down tubes 426 (e.g., four inches, six inches, the entire length of the down tube 426, etc.), according to an exemplary embodiment.

According to an exemplary embodiment, the food preparation unit 310 having an independent heating element 430 positioned within each of the down tubes 426 facilitates providing different amounts of thermal energy to the airflow 412 of the down tubes 426. The temperature regulation system 400 may thereby vary the temperature of the thermally-regulated airflows 438 from one down tube 426 to the next. For example, one of the thermally-regulated airflows 438 may have a first temperature (e.g., one hundred fifty degrees Fahrenheit, etc.), a second one of the thermally-regulated airflows 438 may have a second temperature (e.g., one hundred degrees Fahrenheit, etc.), a third one of the thermally-regulated airflows 438 may have a third temperature (e.g., forty degrees Fahrenheit, etc.), etc. In some embodiments, the temperature regulation system 400 includes an additional heating element 430 positioned near the blower 410 to pre-heat the airflow 412 prior to the airflow reaching the heating elements 430 positioned near the airflow outlets 428. Pre-heating the airflow 412 may facilitate reducing the size of the heating elements 430 and/or reducing the power consumption of the temperature regulation system 400.

In other embodiments, the heating elements 430 are otherwise positioned along the duct system 420 (e.g., within the connecting tubes 422, within the elbow tubes 424, etc.). In one embodiment, a single heating element 430 is positioned near the blower 410 such that the airflow 412 is thermally-regulated near the blower 410, and the temperature of the thermally-regulated airflow 438 is nearly constant at each of the airflow outlets 428. In another embodiment, the heating elements 430 are positioned at another location along the connecting tube 422, the elbow tube 424, and/or the down tube 426 (e.g., where the duct system 420 is arranged in the parallel configuration, etc.).

According to an exemplary embodiment, the heating elements 430 include resistive heating elements used to perform at least a portion of the heating operation of the temperature regulation system 400. The resistive heating element may receive electrical current (i.e., electrical energy) that is passed through the coil 434 to generate heat (e.g., thermal energy, etc.), which is then transferred to the airflow 412 to generate the thermally-regulated airflow 438. According to an alternative embodiment, the heating elements 430 receive a heated working fluid as part of the heating operation. In other embodiments, the heating elements 430 include a different type of heating element (e.g., an induction heating element, etc.).

According to an alternative embodiment, one or more of the thermal elements additionally or alternatively include cooling elements (e.g., in place of or in combination with a heating element, etc.). For example, the thermal elements may be or include a refrigerant coil that is used in a refrigeration cycle to perform a cooling operation on the airflow 412. By way of example, a refrigerant coil may be used along with a working fluid (e.g., a refrigerant such as R-134a, etc.) in a refrigeration cycle. The working fluid flows through the refrigerant coil and absorbs thermal energy (e.g., evaporation, etc.) from the airflow 412 to cool the airflow 412 and a food product, reducing the temperatures thereof. The absorbed thermal energy (e.g., heat, etc.) is rejected into the surrounding environment (e.g., room, air, etc.) or ejected from the building through the remaining steps in the refrigeration cycle (e.g., compression, condensation, expansion, etc.). In other embodiments, the cooling element includes another type of cooling element (e.g., a thermoelectric cooler, etc.).

Figure 15:
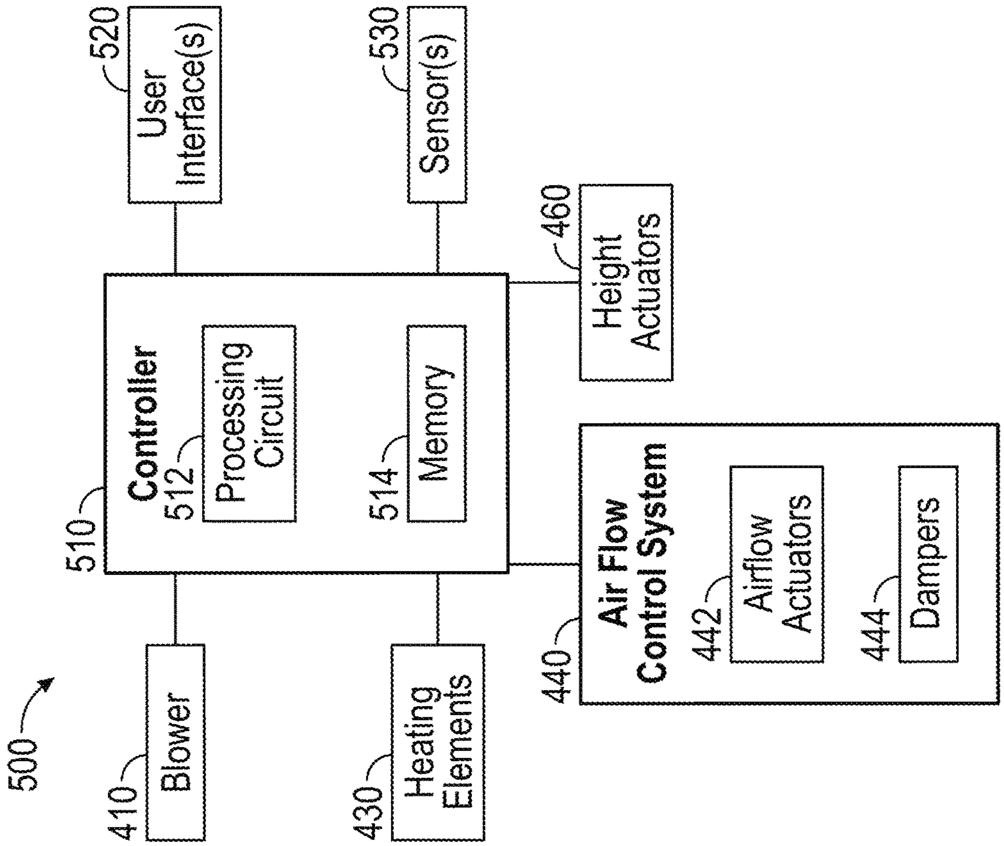
FIG. 15 is a schematic block diagram of a controller for a temperature regulation system, according to an exemplary embodiment.

As shown in FIGS. 11, 12, and 15, the temperature regulation system 400 includes an airflow control system, shown as airflow control system 440. According to an exemplary embodiment, the airflow control system 440 is configured to at least partially selectively control one or more flow characteristics (e.g., mass flow rate, volume flow rate, etc.) of the airflow 412 throughout the duct system 420 and/or the thermally-regulated airflow 438 exiting the duct system 420. As shown in FIGS. 11 and 12, the airflow control system 440 includes one or more actuators (e.g., solenoids, motors, etc.), shown as airflow actuators 442, and one or more corresponding dampers, shown as airflow dampers 444. According to an exemplary embodiment, the airflow dampers 444 are positioned to selectively restrict (e.g., modulate, etc.) the airflow 412 throughout at least a portion of the duct system 420 (e.g., entering and/or exiting a respective down tube 426, etc.). According to an exemplary embodiment, the airflow actuators 442 are positioned to selectively engage and/or disengage the airflow dampers 444. In other embodiments, the airflow dampers 444 are configured to be manually engaged and/or disengaged by an operator of the temperature regulation system 400 (e.g., the airflow control system 440 does not include the airflow actuators 442, etc.). In one embodiment, the airflow dampers 444 include a paddle configured to rotate between an open position and a closed position to variably restrict the amount of airflow 412 that flows past the paddle. In another embodiment, the airflow dampers 444 include a valve configured to variably restrict the amount of airflow 412 that flows past the valve.

As shown in FIG. 12, one of the airflow dampers 444 is positioned within each of the elbow tubes 424 proximate (e.g., at, adjacent, near, etc.) an interface between the connecting tube(s) 422 and the elbow tube 424. The airflow 412 into each of the down tubes 426 may thereby be independently controlled. According to an exemplary embodiment, having an airflow damper 444 positioned within each of the elbow tubes 424 facilitates differentially controlling the airflow 412 through each of the down tubes 426 such that the flow and/or temperature characteristics of the thermally-regulated airflows 438 is selectively variable from one down tube 426 to the next. For example, one of the thermally-regulated airflows 438 may have a first temperature and/or a first flow rate, a second one of the thermally-regulated airflows 438 may have a second temperature and/or a second flow rate, a third one of the thermally-regulated airflows 438 may have a third temperature and/or a third flow rate, etc. In other embodiments, the airflow dampers 444 are otherwise positioned along the duct system 420 (e.g., within the connecting tubes 422, within the down tubes 426, etc.). In another embodiment, the airflow dampers 444 are positioned at still another location along the connecting tube 422, the elbow tube 424, and/or the down tube 426 (e.g., when the duct system 420 is arranged in the parallel configuration, etc.).

According to an exemplary embodiment, the down tubes 426 of the duct system 420 include a plurality of tube sections or portions that are selectively extendable and retractable (e.g., telescoping down tubes, etc.) to change a distance between a food product and/or a temperature controlled zone and the airflow outlet 428. As shown in FIG. 12, the temperature regulation system 400 includes actuators, shown as height actuators 460. According to an exemplary embodiment, the height actuators 460 are positioned to selectively extend and retract the down tubes 426. In other embodiments, the down tubes 426 are configured to be manually extended and/or retracted (e.g., the temperature regulation system 400 does not include the height actuators 460, etc.).

In some embodiments, the temperature regulation system 400 includes one or more humidifiers positioned within the duct system 420 (e.g., along one or more of the connecting tubes 422, along one or more of the elbow tubes 424, along one or more of the down tubes 426, etc.). According to an exemplary embodiment, the one or more humidifiers are configured to humidify the thermally-regulated airflows 438 such that the thermally-regulated airflows 438 do not dry out a food product being heated and/or cooled by the temperature regulation system 400.

Figure 9:
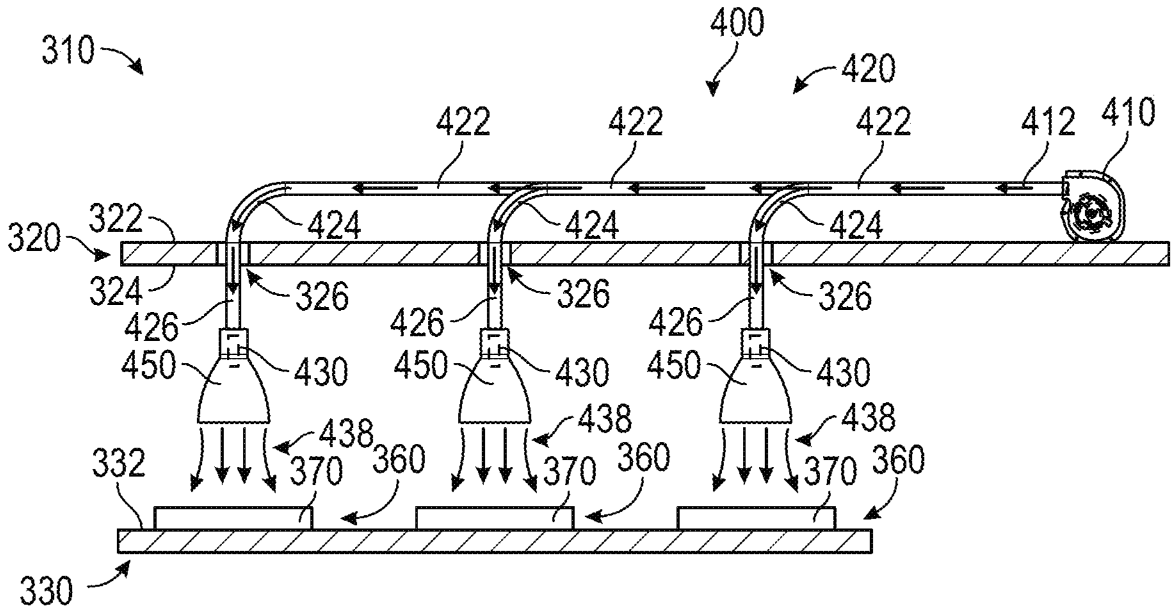
FIG. 9 is a front view of a temperature regulation system installed in a first arrangement, according to an exemplary embodiment.

According to the exemplary embodiment shown in FIG. 9, the temperature regulation system 400 is positioned at least partially above a ceiling, shown as ceiling 320. As shown in FIG. 9, the ceiling 320 includes a first surface, shown as enclosed side 322, and an opposing second surface, shown as open side 324. As shown in FIG. 9, the ceiling 320 defines a plurality of apertures, shown as through-holes 326, positioned to correspond with (e.g., the location of, the size of, etc.) each of the down tubes 426. The down tubes 426 may thereby extend through the through-holes 326 into an open environment (e.g., within a kitchen, etc.) towards a surface, shown as surface 332, of a counter (e.g., table, island, etc.), shown as counter 330. According to the exemplary embodiment shown in FIG. 9, a majority of the temperature regulation system 400 (e.g., the blower 410, the connecting tubes 422, the elbow tubes 424, the airflow actuators 442, the airflow dampers 444, etc.) is positioned above the enclosed side 322 of the ceiling 320 such that the majority of the temperature regulation system 400 is not visible. According to an exemplary embodiment, only a portion of the down tubes 426 extend through the through-holes 326 such that only the portion of each of the down tubes 426 extending past the open side 324 of the ceiling 320 is visible. In other embodiments, the temperature regulation system 400 is at least partially positioned within a cabinet, a soffit, or another suitable installation location.

As shown in FIG. 9, the surface 332 provides a surface configured to receive and support one or more products (e.g., plate, food product, drink, etc.), shown products 370. The products 370 are thereafter heated and/or cooled by the thermally-regulated airflows 438 provided by the temperature regulation system 400 during a heating operation and/or a cooling operation. The products 370 may be positioned beneath each of the down tubes 426 within a region, shown as temperature controlled zone 360. The temperature controlled zone 360 may be at least partially defined by the surface 332. According to an exemplary embodiment, the thermal energy provided by the thermally-regulated airflows 438 of the temperature regulation system 400 maintains a target temperature (or target temperature range) of the products 370 within the temperature controlled zones 360 (e.g., to provide a desired eating experience, to comply with food safety regulations, etc.). In some embodiments, the temperature of the thermally-regulated airflows 438 is varied from one temperature controlled zone 360 to the next to provide varying amounts of thermal energy across the temperature controlled zones 360 (e.g., different temperatures between the temperature controlled zones 360, etc.).

In some embodiments, the surface 332 absorbs and retains thermal energy provided by the thermally-regulated airflows 438 of the temperature regulation system 400 such that the products 370 within the temperature controlled zones 360 may be further temperature controlled with conductive heat transfer. By way of example, the surface 332 may be stone or another thermally-retentive material. Thus, the temperature regulation system 400 may provide thermal energy to the products 370 within the temperature controlled zones 360 through convective heat transfer, conductive heat transfer, radiative heat transfer, or a combination thereof.

Figure 10:
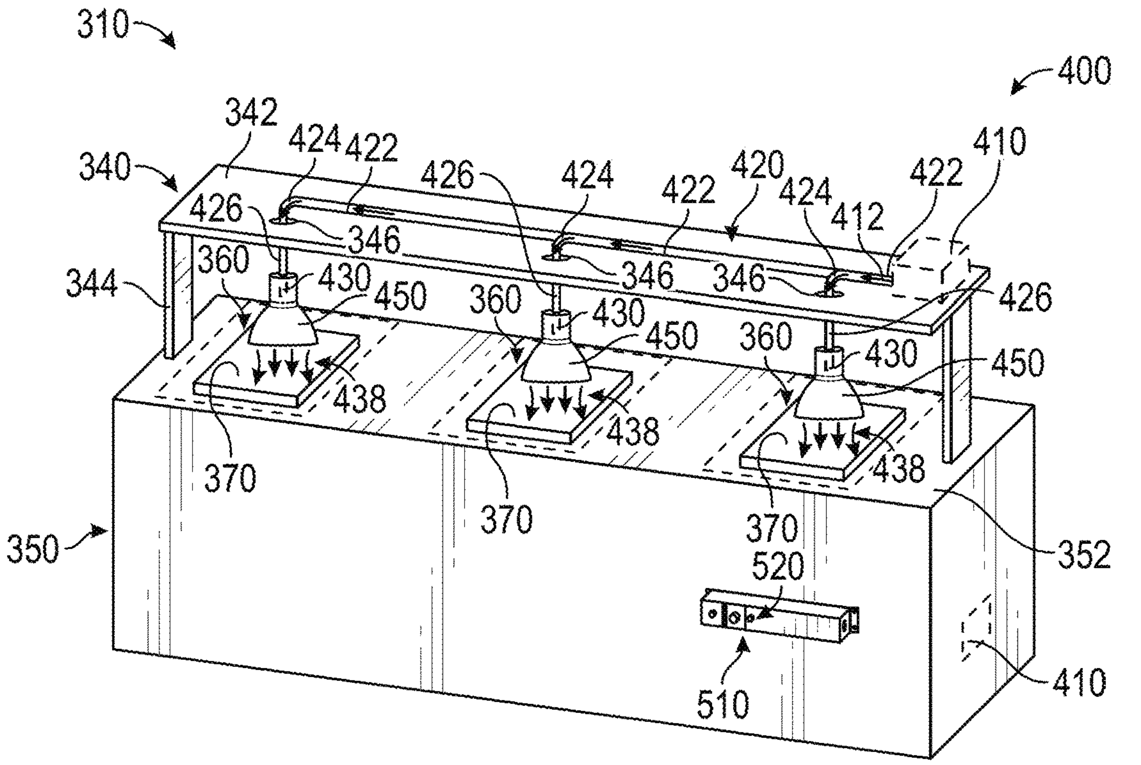
FIG. 10 is a perspective view a temperature regulation system installed in a second arrangement, according to an exemplary embodiment.

According to the exemplary embodiment shown in FIG. 10, the temperature regulation system 400 is mounted on (e.g., attached to, coupled to, etc.) a shelf unit, shown as shelf unit 340. As shown in FIG. 10, the shelf unit 340 includes a shelf, shown as shelf 342, and legs, shown as stands 344. As shown in FIG. 10, the shelf 342 defines a plurality of apertures, shown as through-holes 346, positioned to correspond with (e.g., the location of, the size of, etc.) each of the down tubes 426 such that the down tubes 426 may extend through the through-holes 346 into an open environment (e.g., below the shelf unit 340, etc.).

As shown in FIG. 10, the shelf unit 340 is disposed on top of a base, shown as base 350. According to an exemplary embodiment, the stands 344 are sized to position the airflow outlets 428 of the down tubes 426 a target distance above the base 350. In other embodiments, the stands 344 are adjustable to facilitate selectively repositioning the shelf 342 and/or the airflow outlets 428 of the down tubes 426 a desired distance from the base 350. The stands 344 may be rectangular, square, tubular, etc. and configured to conceal electrical wiring connected to the temperature regulation system 400 and/or other components thereof (e.g., the blower 410, the connecting tubes 422, the airflow actuators 442, etc.). According to the exemplary embodiment shown in FIG. 10, the stands 344 are fixed to the base 350. In some embodiments, the entire food preparation unit 310 is selectively repositionable (e.g., the base 350 includes wheels, etc.). According to alternative embodiments, the stands 344 are not coupled to the base 350 (e.g., the shelf unit 340 is not fixed to the base 350, the shelf unit 340 is repositionable, etc.).

As shown in FIG. 10, the blower 410 and the connecting tubes 422 of the duct system 420 are positioned above the shelf 342. In other embodiments, the blower 410 is otherwise positioned. As shown in FIG. 10, the blower 410 may alternatively be positioned within the base 350 of the food preparation unit 310. By way of example, the duct system 420 (e.g., the connecting tubes 422, etc.) may extend from the blower 410 within the base 350, through the stands 344 of the shelf unit 340, and up to the shelf 342 to facilitate thermally regulating the product 370 from above (like shown in FIG. 10). By way of another example, the duct system 420 may extend from the blower 410 within the base 350 to directly underneath each of the temperature controlled zones 360 to facilitate thermally regulating the product 370 from below.

According to alternative embodiments, the food preparation unit 310 does not include the shelf 342, and the stands 344 are directly coupled to the temperature regulation system 400. In one embodiment, the stands 344 are directly coupled to the temperature regulation system 400 and not adjustable (i.e., have a fixed length to position the temperature regulation system 400 a target distance from the base 350). In other embodiments, the stands 344 are directly coupled to the temperature regulation system 400 and are adjustable. In some embodiments, the stands 344 are structured as "C-leg" stands (e.g., C-shaped, etc.) or "T-leg" stands (e.g., T-shaped, etc.) and configured to facilitate installation and stability of the temperature regulation system 400 onto any surface (e.g., a counter, a table, etc.).

As shown in FIG. 10, the base 350 provides a surface, shown as surface 352, configured to receive and support the product 370. The product 370 is thereafter heated and/or cooled by the thermally-regulated airflows 438 provided by the temperature regulation system 400 during a heating operation and/or a cooling operation. As shown in FIG. 10, the surface 352 is substantially rectangular in shape. In other embodiments, the surface 352 has a different shape (e.g., oval-shaped, square, circular, hexagonal, etc.). As shown in FIG. 10, the surface 352 is substantially flat. In other embodiments, the surface 352 is not flat (e.g., curved, etc.). By way of example, the surface 352 may define one or more depressions (e.g., grooves, indents, valleys, etc.) positioned along the base 350. The depressions may allow a user (e.g., chef, cook, staff, owner, etc.) to separate or arrange various items (e.g., hot and cold items, solid and liquid items, align sandwiches or ice cream bars, etc.). For example, one depression may receive a liquid based food product (e.g., soup, etc.) and another depression may receive a solid based food product (e.g., sandwiches, pasta, etc.). In one embodiment, one depression and/or section of the surface 352 is heated while another depression and/or section is cooled. In yet another embodiment, the surface 352 absorbs and retains thermal energy provided by the thermally-regulated airflow 438 of the temperature regulation system 400 such that the products 370 within the temperature controlled zones 360 may be further temperature controlled with conductive heat transfer. Thus, the temperature regulation system 400 may provide thermal energy to the products 370 within the temperature controlled zones 360 through convective heat transfer, conductive heat transfer, radiative heat transfer, or a combination thereof.

As shown in FIGS. 9-10, the temperature regulation system 400 includes a plurality of shades, shown as shades 450, positioned over the airflow outlets 428 of the down tubes 426. According to an exemplary embodiment, the shades 450 are configured (e.g., shaped, etc.) to shape the thermally-regulated airflows 438 (e.g., to disperse the thermally-regulated airflows 438 over a greater area of the temperature controlled zones 360 such that the thermally-regulated airflows 438 are not directed and/or concentrated on a small area of the products 370, to aid in evenly regulating the temperature of the products 370, to focus the thermally-regulated airflow 438, etc.). The shades 450 may have a decorative and/or aesthetically-appealing shape and/or appearance. In other embodiments, the duct system 420 does not include the shades 450.

In some embodiments, the temperature regulation system 400 includes one or more lighting elements. The lighting elements may be configured to illuminate a target area, illuminate a target environment, and/or provide decorative lighting to enhance the aesthetics of the temperature regulation system 400. The lighting elements may include light bulbs, LEDs, or still other lighting devices. In some embodiments, the lighting elements are configured to illuminate one or more of the temperature controlled zones 360, one or more of the products 370, the area underneath one or more down tubes 426, and/or the surrounding environment. In one embodiment, the lighting elements are coupled to (e.g., disposed on, disposed within, etc.) one or more of the shades 450. In another embodiment, the lighting elements are coupled to (e.g., disposed on, disposed within, etc.) one or more of the down tubes 426. In other embodiments, the lighting elements are otherwise positioned (e.g., on the underside of the shelf 342, etc.).

According to an exemplary embodiment, the food preparation unit 310 is an open food preparation unit such that the products 370 are heated and/or cooled by the temperature regulation system 400 in an at least partially open environment (e.g., a kitchen; not a closed case; a heating rack, shelf, or counter; etc.). The heating and/or cooling is also provided through at least a convective heat transfer operation within an at least partially open environment, according to an exemplary embodiment.

According to the exemplary embodiment shown in FIG. 15, a control system 500 for a temperature regulation system (e.g., the temperature regulation system 400, etc.) includes a controller 510. In one embodiment, the controller 510 is configured to selectively engage, selectively disengage, control, or otherwise communicate with components of the temperature regulation system 400. As shown in FIG. 15, the controller 510 is coupled to the blower 410, the heating elements 430 (and/or cooling elements), the airflow control system 440, the height actuators 460, a user interface 520, and one or more sensors 530.

The controller 510 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 15, the controller 510 includes a processing circuit 512 and a memory 514. The processing circuit 512 may include an ASIC, one or more FPGAs, a DSP, circuits containing one or more processing components, circuitry for supporting a microprocessor, a group of processing components, or other suitable electronic processing components. In some embodiments, the processing circuit 512 is configured to execute computer code stored in the memory 514 to facilitate the activities described herein. The memory 514 may be any volatile or non-volatile computer-readable storage medium capable of storing data or computer code relating to the activities described herein. According to an exemplary embodiment, the memory 514 includes computer code modules (e.g., executable code, object code, source code, script code, machine code, etc.) configured for execution by the processing circuit 512. In some embodiments, the controller 510 may represent a collection of processing devices (e.g., servers, data centers, etc.). In such cases, the processing circuit 512 represents the collective processors of the devices, and the memory 514 represents the collective storage devices of the devices.

According to an exemplary embodiment, the controller 510 is configured to control the temperature regulation system 400. In one embodiment, a user may control the temperature regulation system 400 with the user interface 520. The controller 510 may be communicably coupled to various components of the temperature regulation system 400 (e.g., the airflow actuators 442, the height actuators 460, the blower 410, the heating elements 430, the cooling elements, the sensors 530, the humidifier, etc.) such that information or signals (e.g., command signals, etc.) may be provided to or from the controller 510. The information or signals may relate to one or more components of the temperature regulation system 400. According to the exemplary embodiment shown in FIG. 10, the controller 510 is located remotely relative to the temperature regulation system 400. In other embodiments, the controller 510 is directly coupled to a portion of the temperature regulation system 400. In still other embodiments, the controller 510 is provided by a web-based or wireless system that is communicably coupled to the temperature regulation system 400 (e.g., an Internet connected temperature regulation system, a near field communication temperature regulation system, a mobile application, etc.).

According to an exemplary embodiment, the user interface 520 facilitates communication between an operator (e.g., a cook, a chef, a staff member, etc.) of the temperature regulation system 400 and one or more components of the temperature regulation system 400. By way of example, the user interface 520 may include at least one of an interactive display, a touchscreen device, one or more buttons (e.g., a stop button configured to turn the unit off, buttons allowing a user to set a target temperature, etc.), switches, and the like. In one embodiment, the user interface 520 includes a notification device (e.g., alarm, light, display, etc.) that notifies the operator when the blower 410, the heating elements 430, the cooling elements, and/or the humidifier are on, off, in a standby mode, in an heating mode, and/or in a cooling mode. According to an exemplary embodiment, a user may interact with the user interface 520 to turn the temperature regulation system 400 on or off. According to another exemplary embodiment, a user may interact with the user interface 520 to enter a desired operating set point (e.g., an operating power level, an operating temperature, etc.) for the heating mode of operation and/or the cooling mode of operation. In another embodiment, a display shows a current temperature of the heating elements 430, the cooling elements, a current temperature of the thermally-regulated airflow 438, a current temperature of the temperature controlled zones 360, a target temperature (e.g., of the temperature controlled zone 360, of the products 370, of the heating elements 430, of the thermally-regulated airflow 438, etc.), and/or a time until the target temperature is reached.

In one embodiment, the sensors 530 are positioned to monitor the temperature controlled zones 360 for the presence of the products 370. In some embodiments, the sensors 530 include an infrared sensor. In another embodiment, the sensors 530 include an LED with a phototransistor. In other embodiments, the sensors 530 include another type of sensor capable of monitoring the temperature controlled zone 360 for the presence of products 370 (e.g., a scale, etc.). In some embodiments, the sensors 530 are configured to monitor the temperature of the temperature controlled zones 360, the products 370, the thermally-regulated airflow 438, the cooling elements, and/or the heating elements 430. According to an alternative embodiment, one or more of the sensors 530 include temperature sensors positioned to monitor the temperature of the products 370, the temperature controlled zones 360, and/or the heating elements 430. The sensors 530 may include infrared temperature sensors, probes, or still other devices. The sensors 530 may be positioned within the duct system 420, with a shelf or hood above the temperature controlled zone 360, at or within a surface of the food preparation unit 310, within a wrapper or box of the product 370, etc.

According to an exemplary embodiment, the controller 510 is configured to control at least one of the blower 410, the heating elements 430, the cooling elements, the airflow control system 440, the height actuators 460, and the humidifier based on inputs received from an operator using the user interface 520. By way of example, an operator may provide an input to engage or disengage the airflow dampers 444 with the airflow actuators 442 to modulate the airflow characteristics of the thermally-regulated airflows 438 exiting the down tubes 426. By way of another example, an operator may provide an input to engage or disengage the height actuators 460 to extend and/or retract one or more of the down tubes 426. By way of yet another example, the an operator may provide an input to turn on or off the temperature regulation system 400 and/or the lighting elements of the temperature regulation system 400.

According to an exemplary embodiment, the controller 510 is configured to control at least one of the blower 410, the heating elements 430, the cooling elements, the airflow control system 440, the height actuators 460, and the humidifier in response to readings from the sensors 530 and/or inputs received by an operator with the user interface 520. By way of example, an operator may provide an input for a desired temperature of a product 370. The controller 510 may adaptively control the flow rate of the airflow 412 out of the blower 410 (e.g., by controlling the speed of the blower 410, etc.), the flow rate of the thermally-regulated airflow 438 out of the down tubes 426 (e.g., by controlling the position of the airflow dampers 444 with the airflow actuators 442, etc.), the temperature of the heating elements 430 (e.g., by controlling the current and/or voltage provided to the heating elements 430, etc.), the temperature of the cooling elements, and/or the height of the down tubes 426 (e.g., by controlling the height actuators 460, etc.) to maintain the desired temperature of the product 370 (e.g., within each respective temperature controlled zone 360, etc.).

Figure 16:
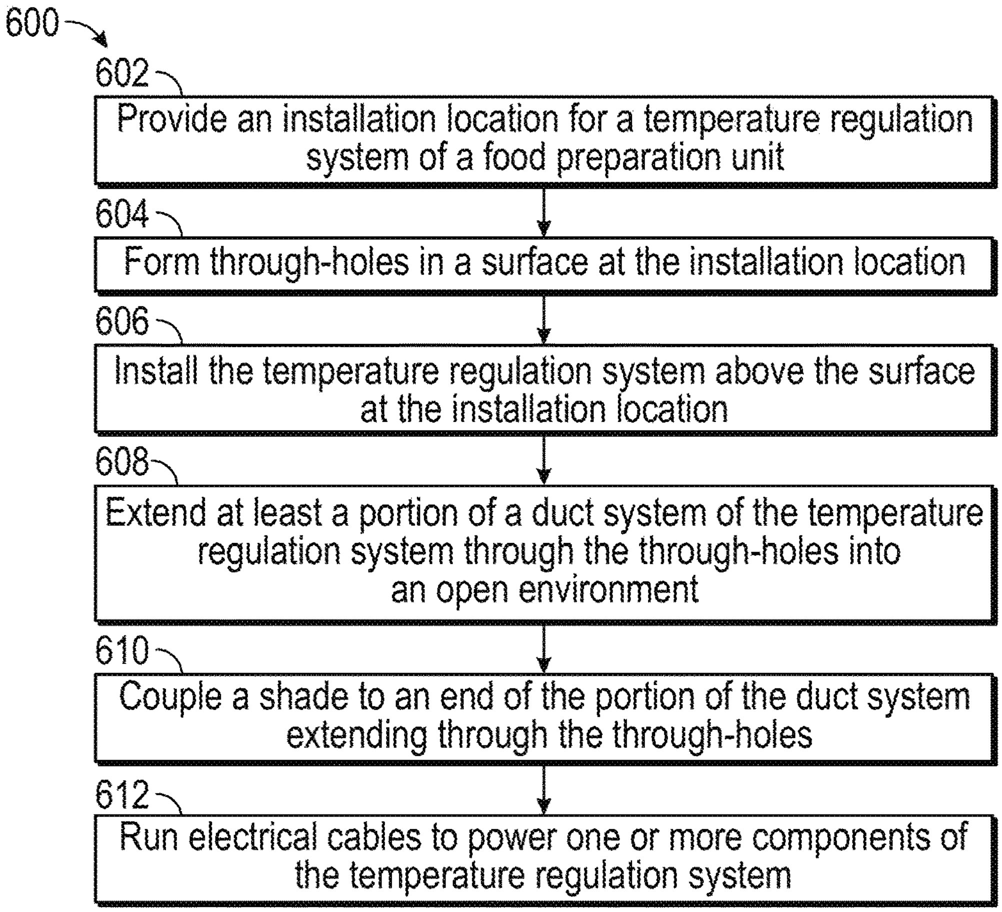
FIG. 16 is a flow diagram of a method for installing a temperature regulation system, according to an exemplary embodiment.

Referring now to FIG. 16, method 600 for installing a food preparation unit is shown according to an example embodiment. In one example embodiment, method 600 may be implemented with the food preparation unit 310 of FIG. 9. In another example embodiment, method 600 may be implemented with the food preparation unit 310 of FIG. 10. Accordingly, method 600 may be described in regard to FIG. 9 and/or FIG. 10

At step 602, an installation location is provided for a temperature regulation system (e.g., the temperature regulation system 400, etc.) of a food preparation unit (e.g., the food preparation unit 310, etc.). The installation location may include a surface of a ceiling (e.g., the ceiling 320, etc.), a cabinet, a soffit, and/or a shelf (e.g., the shelf 342, etc.), among other possibilities. According to an exemplary embodiment, the installation location is at least partially open to a surrounding environment (e.g., beneath the surface is all open to the surrounding environment, etc.). At step 604, through-holes (e.g., the through-holes 326, the through-holes 346, etc.) are formed in the surface at the installation location. For example, the through-holes may be drilled, cut, or otherwise formed by removing material from the surface at the installation location. In other embodiments, the through-holes are pre-defined by the surface at the installation location (e.g., during manufacturing, etc.). According to an exemplary embodiment, the through-holes are defined by the surface to correspond with one or more components of a duct system (e.g., the duct system 420, the down tubes 426, etc.) of the temperature regulation system.

At step 606, the temperature regulation system is installed above the surface at the installation location. At step 608, at least a portion of a duct system (e.g., the duct system 420, etc.) of the temperature regulation system is extended through the through-holes into an open environment. For example, down tubes (e.g., the down tubes 426, etc.) of the temperature regulation system are positioned to extend through the through-holes of the surface such that the down tubes of the temperature regulation system are positioned below the surface (e.g., the connecting tubes 422, the elbow tubes 424, and the blower 410 are not visible and/or are positioned above the surface, the down tubes 426 are positioned in the open environment, etc.). At step 610, a shade (e.g., the shades 450, etc.) is coupled to an end of the portion of the duct system extending through the through-holes (e.g., the down tubes 426, etc.). In some embodiments, lighting elements are installed on and/or within the shades. At step 612, electrical wires are run to power one or more components of the temperature regulation system (e.g., the heating elements 430, the cooling elements, the blower 410, the airflow control system 440, the height actuators 460, the lighting elements, etc.).

Figure 17:
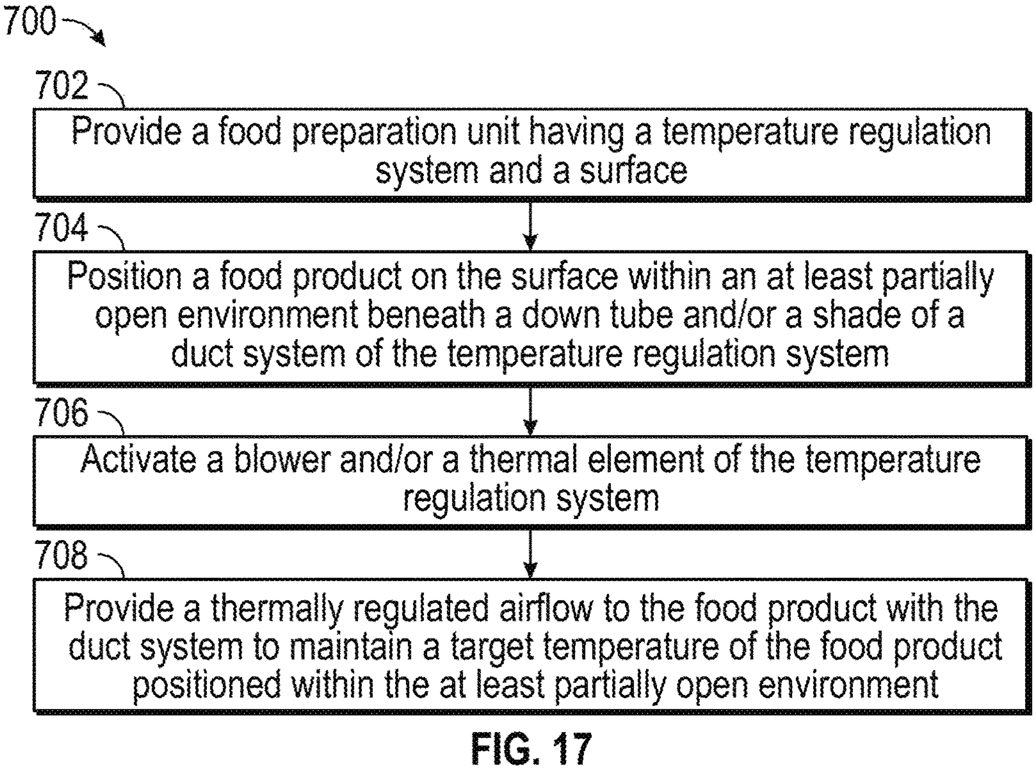
FIG. 17 is a flow diagram of a method for using a temperature regulation system, according to an exemplary embodiment.

Referring now to FIG. 17, method 700 for using a food preparation unit is shown according to an example embodiment. In one example embodiment, method 700 may be implemented with the food preparation unit 310 of FIG. 9. In another example embodiment, method 700 may be implemented with the food preparation unit 310 of FIG. 10. Accordingly, method 700 may be described in regard to FIG. 9 and/or FIG. 10

At step 702, a food preparation unit is provided (e.g., the food preparation unit 310, see method 600, etc.) having a temperature regulation system (e.g., the temperature regulation system 400, etc.) and a surface (e.g., the surface 332, the surface 352, etc.). At step 704, a food product is positioned on the surface within an at least partially open environment beneath a down tube (e.g., the down tube 426, etc.) and/or shade (e.g., the shade 450, etc.) of a duct system (e.g., the duct system 420, etc.) of the temperature regulation system. At step 706, a blower (e.g., the blower 410, etc.) and/or a thermal element (e.g., the heating element 430, a cooling element, etc.) of the temperature regulation system are activated (e.g., turned on, etc.). At step 708, the temperature regulation system provides a thermally-regulated airflow (e.g., a heated airflow, a cooled airflow, the thermally-regulated airflow 438, a humidified airflow, etc.) to the food product with the duct system to maintain a target temperature of the food product positioned within the at least partially open environment.

According to the exemplary embodiment shown in FIGS. 18-22, a food regulation unit (e.g., a convection heat lamp, a radiant heat lamp light bulb replacement unit, a blow ray lamp, etc.), shown as temperature regulation unit 800, is configured to generate and provide thermal energy to heat and/or maintain a temperature of a food product (e.g., as a heat lamp for a kitchen, etc.). In other embodiments, the temperature regulation unit 800 is configured to generate and provide thermal energy to heat and/or maintain a temperature in a temperature controlled space (e.g., as a heat lamp for a bathroom, as a heat lamp for a terrarium, etc.). In alternative embodiments, the temperature regulation unit 800 is configured to additionally or alternatively remove thermal energy to cool a food product and/or cool a temperature controlled space. By way of example, the temperature regulation unit 800 may be used with and/or in a canister lighting system (e.g., similar to the temperature regulation unit 20 in FIG. 6, etc.). By way of another example, the temperature regulation unit 800 may be used with and/or in a heat lamp (e.g., similar to the temperature regulation unit 20 in FIG. 7, etc.).

Figure 18:
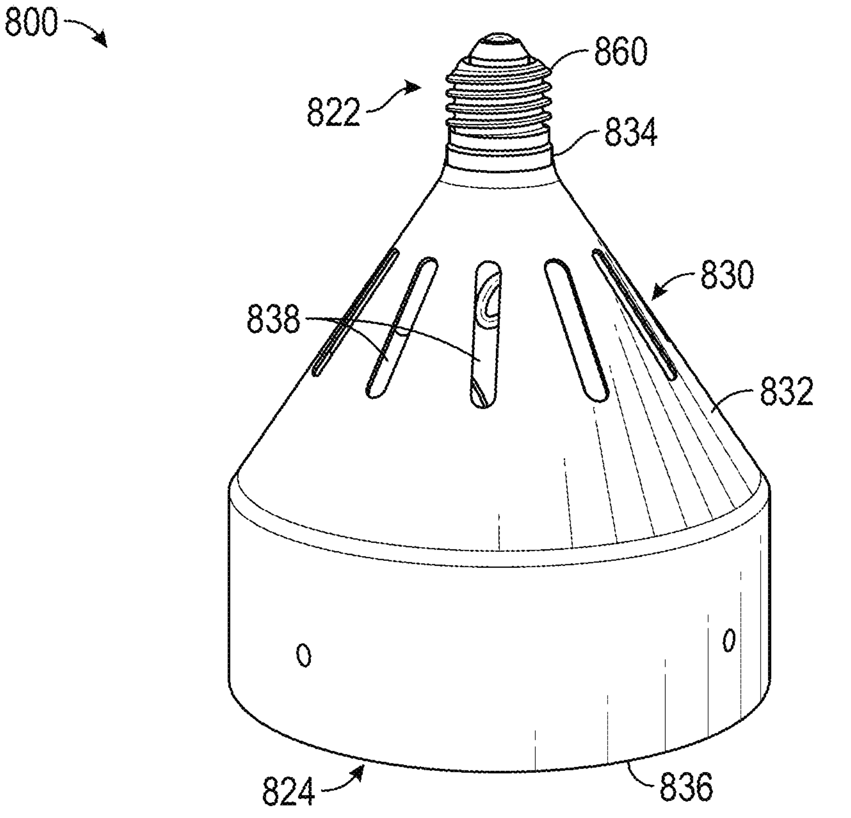
FIG. 18 is a perspective view of a temperature regulation unit, according to an exemplary embodiment.
Figure 19:
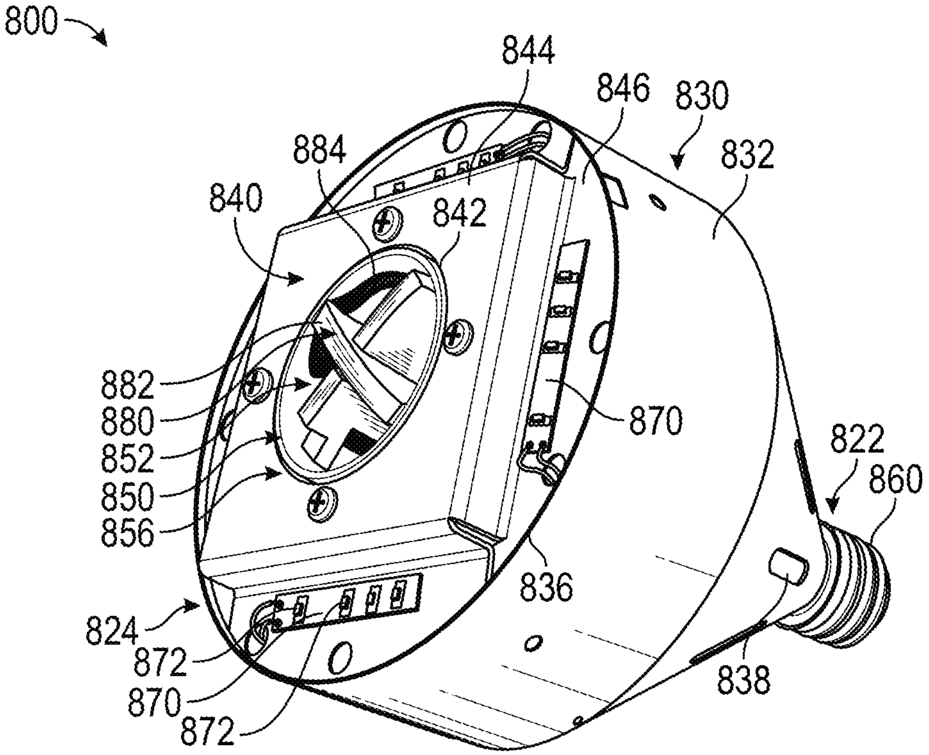
FIG. 19 is a bottom perspective view of the temperature regulation unit of FIG. 18, according to an exemplary embodiment.

As shown in FIGS. 18-22, the temperature regulation unit 800 includes a housing, shown as shroud 830; a coupler, shown as bracket 840; a conduit, shown as down tube 850; an electrical connector, shown as male electrical connector 860, a plurality of lighting elements, shown as lighting elements 870; a thermal element, shown as heating element 880; and a driver, shown as fan 890. As shown in FIGS. 18 and 19, the temperature regulation unit 800 has a first end, shown as upper end 822, and an opposing second end, shown as lower end 824. The male electrical connector 860 is positioned at the upper end 822 of the temperature regulation unit 800. According to an exemplary embodiment, the male electrical connector 860 is electrically coupled to the lighting elements 870, the heating element 880, and the fan 890. The male electrical connector 860 of the temperature regulation unit 800 is configured to interface with (e.g., be threaded into, etc.) a female electrical connector to facilitate powering the lighting elements 870, the heating element 880, and the fan 890, according to an exemplary embodiment. According to an exemplary embodiment, the male electrical connector 860 is a male screw thread contact.

As shown in FIGS. 18 and 19, the shroud 830 has a sidewall, shown as sidewall 832. According to an exemplary embodiment, the sidewall 832 is shaped to correspond with the shape and/or size of a traditional radiant heat lamp light bulb (e.g., has a tapered profile, etc.). In other embodiments, the sidewall 832 is otherwise shaped (e.g., oval-shaped, square, circular, hexagonal, triangular, rectangular, etc.; like an A, B, C, CA, RP, S, F, R, MR, BR, G, PAR, etc. series light bulb; etc.). As shown in FIGS. 18 and 19, the sidewall 832 defines a first aperture, shown as connector opening 834, positioned at the upper end 822 of the shroud 830 and an opposing second aperture, shown as airflow outlet 836, positioned at the lower end 824 of the shroud 830. The connector opening 834 is configured to receive the male electrical connector 860 such that the male electrical connector 860 extends through the shroud 830. According to an exemplary embodiment, the sidewall 832 of the shroud 830 defines an internal cavity that receives and houses the down tube 850, the heating element 880, the fan 890, and/or other components of the temperature regulation unit 800. As shown in FIGS. 18 and 19, the sidewall 832 defines a plurality of apertures, shown as vents 838. According to an exemplary embodiment, the vents 838 are positioned to provide a flow path for air to flow from an ambient environment into the internal cavity of the shroud 830.

Figure 20:
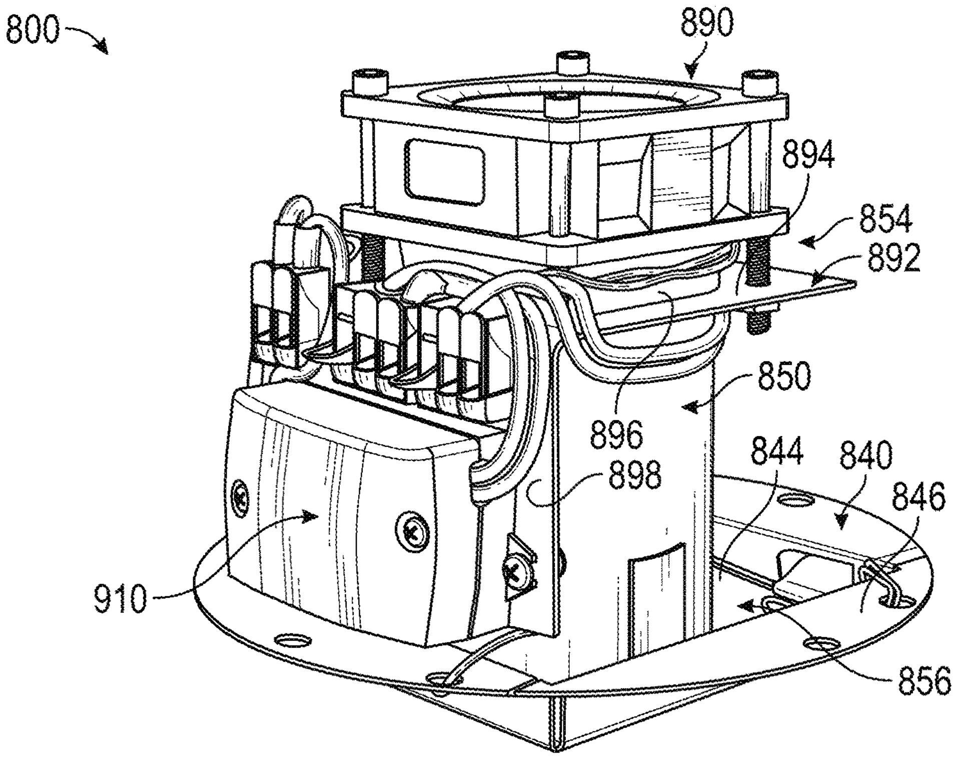
FIG. 20 is a perspective view of internal components of the temperature regulation unit of FIG. 18, according to an exemplary embodiment.
Figure 21:
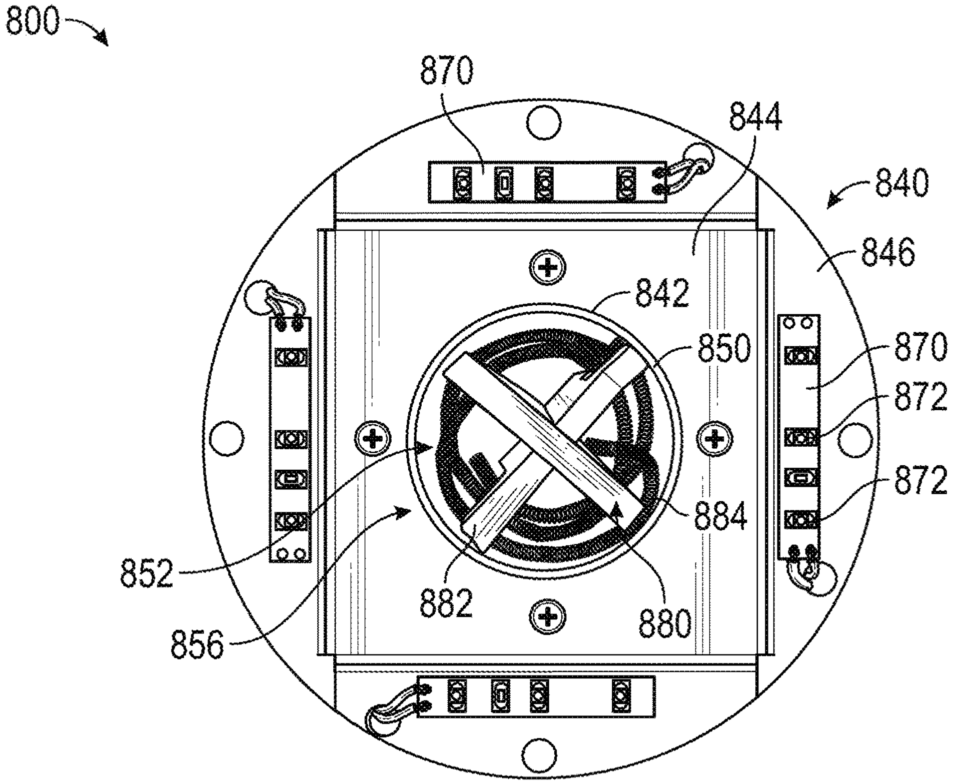
FIG. 21 is a bottom view of the internal components of the temperature regulation unit of FIG. 18, according to an exemplary embodiment.
Figure 22:
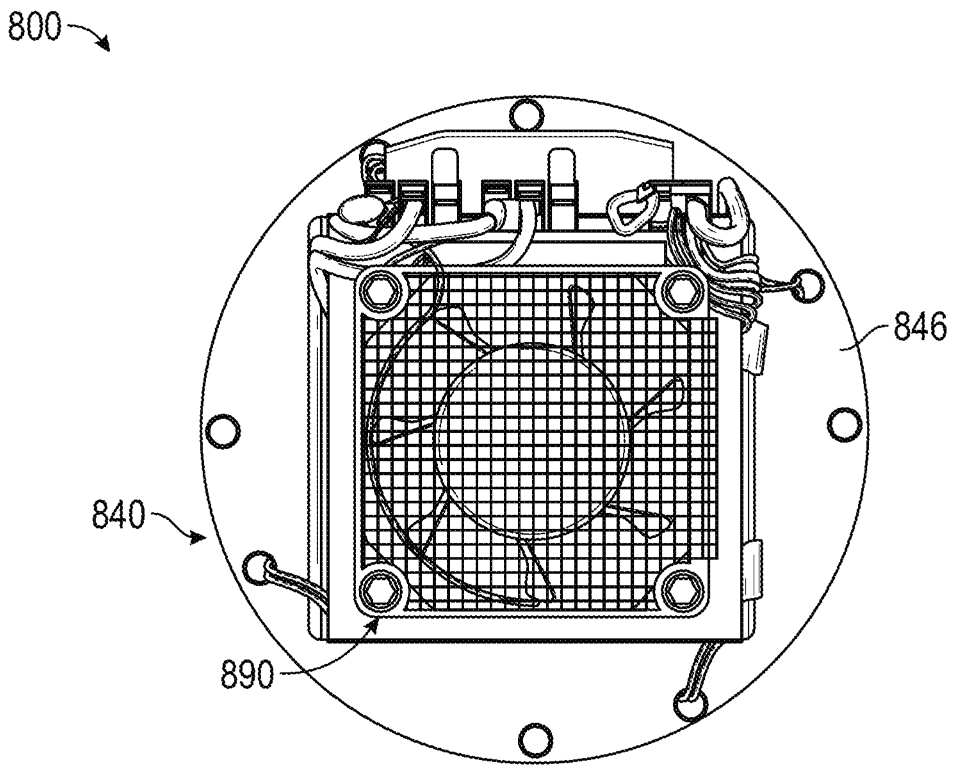
FIG. 22 is a top view of the internal components of the temperature regulation unit of FIG. 18, according to an exemplary embodiment.

As shown in FIGS. 19-22, the bracket 840 includes a plate, shown as plate 844, and a plurality of flanges, shown as flanges 846, extending therefrom. As shown in FIG. 19, the bracket 840 is positioned to at least partially enclose the airflow outlet 836 of the shroud 830. According to an exemplary embodiment, the bracket 840 is releasably coupled to the shroud 830 with a plurality of fasteners (e.g., screws, etc.). As shown in FIGS. 19 and 21, the plate 844 defines an aperture, shown as airflow aperture 842. As shown in FIGS. 19 and 21, the lighting elements 870 are disposed along the flanges 846 of the bracket 840. The lighting elements 870 include a plurality of lights, shown as lights 872. The lighting elements 870 may be configured to illuminate a target area, illuminate a target environment, illuminate a food product, and/or provide decorative lighting to enhance the aesthetics of the temperature regulation unit 800. The lights 872 may include light bulbs, light emitting diodes (LEDs), or still other lighting devices. According to an exemplary embodiment, the lights 872 include LEDs.

As shown in FIGS. 19 and 21, the down tube 850 defines an internal cavity, shown as airflow passage 852, that extends from a first end, shown as upper end 854, to an opposing second end, shown as lower end 856, thereof. As shown in FIGS. 19 and 21, the lower end 856 of the down tube 850 is received by the airflow aperture 842 defined within the plate 844 of the bracket 480. The airflow passage 852 may thereby lead from the internal cavity of the shroud 830 to an external environment. According to an exemplary embodiment, the airflow passage 852 is configured to provide a flow path for air to flow from within the internal cavity of the shroud 830 and out through the airflow aperture 842 into the external environment.

As shown in FIG. 20, the fan 890 is positioned at the upper end 854 of the down tube 850, opposite the bracket 840. According to an exemplary embodiment, the fan 890 includes a fan blade. According to an exemplary embodiment, the fan 890 is configured rotate the fan blade to move or drive a fluid to produce an airflow (e.g., humidified air, hot air, cool air, ambient air, etc.) through the airflow passage 852 of the down tube 850. In one embodiment, the fan 890 is a variable speed fan. In another embodiment, the fan 890 is a fixed speed fan. According to an exemplary embodiment, the fan 890 is configured to draw air from an external environment through the vents 838, into the internal cavity of the shroud 830, and force the air through the airflow passage 852 of the down tube 850 and out the airflow aperture 842. In still other embodiments, the temperature regulation unit 20 includes another type of driver (e.g., a blower, an air multiplier, etc.).

As shown in FIGS. 19 and 21, the heating element 880 is positioned within the airflow passage 852 of the down tube 850. The heating element 880 includes a body, shown as heating element body 882, and a thermal member, shown as coil 884. In one embodiment, the coil 884 is wrapped around the heating element body 882. In other embodiments, the coil 884 is otherwise coupled to the heating element body 882. According to an exemplary embodiment, the heating element body 882 is manufactured from mica. In other embodiments, the heating element body 882 is manufactured from another material (e.g., stainless steel, a ceramic material, etc.). According to an exemplary embodiment, the coil 884 of the heating element 880 is configured to provide thermal energy to the airflow provided by the fan 890 (e.g., to heat the airflow, etc.) as the airflow flows over the heating element 880 to perform a heating operation to thermally regulate a temperature of the airflow to a target temperature. Thus, a thermally-regulated airflow may exit the airflow aperture 842. The temperature regulation unit 800 may thereby thermally regulate the temperature of a food product within a temperature controlled zone below the airflow aperture 842 with the thermally-regulated airflow (e.g., by way of convective heat transfer, etc.). The heating element 880 extends within the down tube 850 and longitudinally along a length of a central axis the down tube 850 (e.g., two inches, four inches, six inches, the entire longitudinal length of the down tube 850, etc.), according to an exemplary embodiment.

According to an exemplary embodiment, the coil 884 of the heating element 880 includes a resistive heating element configured to perform at least a portion of the heating operation of the temperature regulation unit 800. The resistive heating element may receive electrical current (i.e., electrical energy) that is passed through the coil 884 of the heating element 880 to generate heat (e.g., thermal energy, etc.), which is transferred to the airflow produced by the fan 890 to generate the thermally-regulated airflow. In some embodiments, the heating element 880 receives a heated working fluid as part of the heating operation. In other embodiments, the heating element 880 includes a different type of heating element (e.g., an induction heating element, etc.).

According to an alternative embodiment, the thermal element additionally or alternatively includes a cooling element (e.g., in place of or in combination with a heating element, etc.). For example, the thermal element may be or include a refrigerant coil that is used in a refrigeration cycle to perform a cooling operation on the airflow produced by the fan 890. By way of example, a refrigerant coil may be used along with a working fluid (e.g., a refrigerant such as R-134a, etc.) in a refrigeration cycle. The working fluid flows through the refrigerant coil and absorbs thermal energy (e.g., through evaporation, etc.) from the airflow to cool the airflow, a food product, and/or a temperature-controlled zone, reducing the temperatures thereof. The absorbed thermal energy (e.g., heat, etc.) is rejected into the surrounding environment (e.g., room, air, etc.) or ejected from the building through the remaining steps in the refrigeration cycle (e.g., compression, condensation, expansion, etc.). In other embodiments, the cooling element includes another type of cooling element (e.g., a thermoelectric cooler, etc.).

As shown in FIG. 20, the temperature regulation unit 800 includes a second bracket, shown as bracket 892, having a first flange, shown as fan flange 894, and a second flange, shown as electronics flange 898. The fan flange 894 defines an aperture, shown as down tube aperture 896. The down tube aperture 896 is configured to receive the upper end 854 of the down tube 850 such that the bracket 892 couples thereto. As shown in FIG. 20, the fan flange 894 is positioned to facilitate coupling the fan 890 thereto (e.g., via a plurality of fasteners, etc.) such that the fan 890 is secured to the upper end 854 of the down tube 850. According to the exemplary embodiment shown in FIG. 20, the electronics flange 898 extends perpendicularly from the fan flange 894 such that the electronics flange 898 extends and is disposed along a longitudinal length of the down tube 850. As shown in FIG. 20, the electronics flange 898 is positioned to facilitate coupling processing electronics, shown as controller 910, of the temperature regulation unit 800 thereto (e.g., via a plurality of fasteners, etc.) such that the controller 910 is secured within the internal cavity of the shroud 830.

In some embodiments, the temperature regulation unit 800 includes a humidifier positioned within the shroud 830 and/or the down tube 850. According to an exemplary embodiment, the humidifier is configured to humidify the thermally-regulated airflow, reducing the risk of the thermally-regulated airflow drying out a food product being heated and/or cooled by the temperature regulation unit 800.

According to an exemplary embodiment, the temperature regulation unit 800 provides various advantages relative to radiative heating light bulbs. By way of example, radiative heating light bulbs may be fragile (e.g., as they may be made of glass, etc.) and have a relatively short operating life (e.g., one to three years, etc.). The temperature regulation unit 800 may have greater durability (e.g., the shroud 830 may be made of metal, plastic, etc.) and have a greater operating life (e.g., ten, twenty, thirty, etc. years). By way of example, the heating element 880 may have a greater operating life than a heating element (i.e., a light bulb filament) of a radiative heating light bulb. By way of another example, the lights 872 (e.g., LEDs, etc.) may have a greater operating life than a light source (i.e., a light bulb filament) of a radiative heating light bulb. By way of yet another example, the temperature regulation unit 800 may facilitate easier and more accurate control of the temperature of a food product and/or a target area relative to traditional radiative heating light bulb (e.g., by modulating a speed of the fan, modulating current and/or voltage provided to the heating element 880, etc.). By way of example, the temperature regulation unit 800 may be used with the food preparation unit 100 of FIGS. 6 and/or 7.

Figure 23:
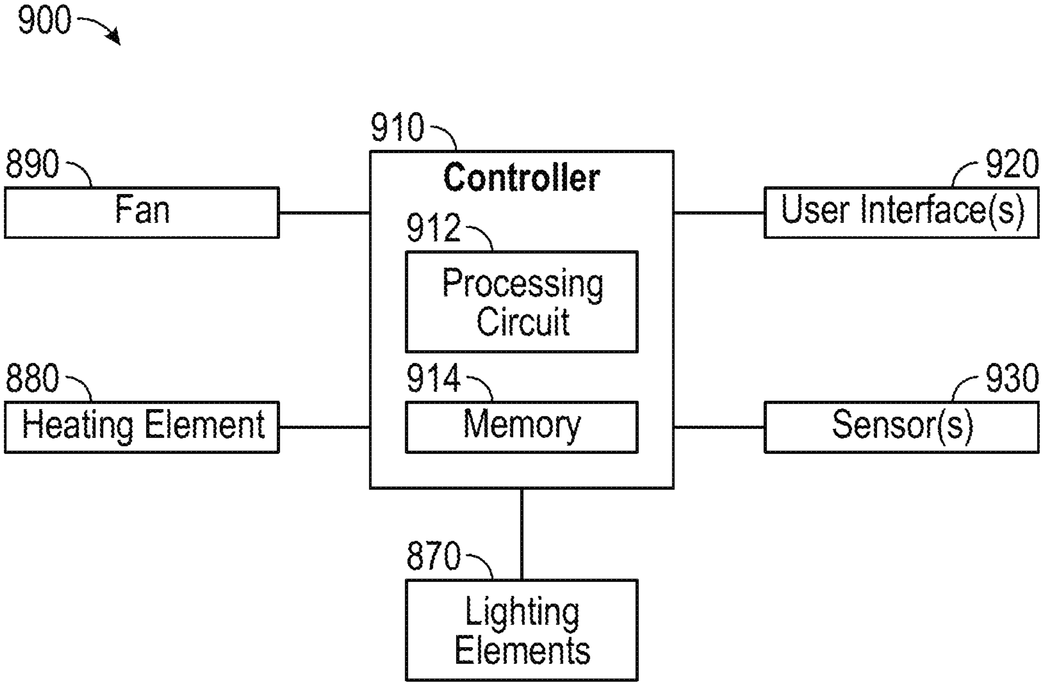
FIG. 23 is a schematic block diagram of a controller for a temperature regulation unit, according to an exemplary embodiment.

According to the exemplary embodiment shown in FIG. 23, a control system 900 for a thermal regulation unit (e.g., the temperature regulation unit 800, etc.) includes the controller 910. In one embodiment, the controller 910 is configured to selectively engage, selectively disengage, control, and/or otherwise communicate with components of the temperature regulation unit 800. As shown in FIG. 23, the controller 910 is coupled to the lighting elements 870, the heating element 880 (and/or cooling element), and/or the fan 890 of the temperature regulation unit 800, a user interface 920, and one or more sensors 930.

The controller 910 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 23, the controller 910 includes a processing circuit 912 and a memory 914. The processing circuit 912 may include an ASIC, one or more FPGAs, a DSP, circuits containing one or more processing components, circuitry for supporting a microprocessor, a group of processing components, or other suitable electronic processing components. In some embodiments, the processing circuit 912 is configured to execute computer code stored in the memory 914 to facilitate the activities described herein. The memory 914 may be any volatile or non-volatile computer-readable storage medium capable of storing data or computer code relating to the activities described herein. According to an exemplary embodiment, the memory 914 includes computer code modules (e.g., executable code, object code, source code, script code, machine code, etc.) configured for execution by the processing circuit 912. In some embodiments, the controller 910 may represent a collection of processing devices (e.g., servers, data centers, etc.). In such cases, the processing circuit 912 represents the collective processors of the devices, and the memory 914 represents the collective storage devices of the devices.

According to an exemplary embodiment, the controller 910 is configured to control the temperature regulation unit 800. In one embodiment, a user may control the temperature regulation unit 800 with the user interface 920. The controller 910 may be communicably coupled to various components of the temperature regulation unit 800 (e.g., the lighting elements 870, the heating element 880, the fan 890, the cooling element, the user interface 920, the sensors 930, the humidifier, etc.) such that information or signals (e.g., command signals, etc.) may be provided to and/or from the controller 910. The information or signals may relate to one or more components of the temperature regulation unit 800. According to the exemplary embodiment, the controller 910 is located remotely relative to the temperature regulation unit 800. In other embodiments, the controller 910 is directly coupled to a portion of the temperature regulation unit 800 (e.g., the shroud 830, etc.). In still other embodiments, the controller 910 is provided by a web-based or wireless system that is communicably coupled to the temperature regulation unit 800 (e.g., an Internet connected temperature regulation unit, a near field communication temperature regulation unit, with a mobile application, etc.).

According to an exemplary embodiment, the user interface 920 facilitates communication between an operator (e.g., a cook, a chef, a staff member, etc.) of the temperature regulation unit 800 and one or more components of the temperature regulation unit 800. By way of example, the user interface 920 may include at least one of an interactive display, a touchscreen device, one or more buttons (e.g., a stop button configured to turn the unit off, buttons allowing a user to set a target temperature, etc.), switches, and the like. In one embodiment, the user interface 920 includes a notification device (e.g., alarm, light, display, etc.) that notifies the operator when the lighting elements 870, the heating element 880, the cooling element, the fan 890, and/or the humidifier are on, off, in a standby mode, in a heating mode, and/or in a cooling mode. According to an exemplary embodiment, a user may interact with the user interface 920 to turn the temperature regulation unit 800 on or off. According to another exemplary embodiment, a user may interact with the user interface 920 to enter a desired operating set point (e.g., an operating power level, an operating temperature, etc.) and/or increase or decrease the operating set point for the heating mode of operation and/or the cooling mode of operation of the temperature regulation unit 800. In another embodiment, a display shows a current temperature of the heating element 880, the cooling element, a current temperature of a thermally-regulated airflow, a current temperature of a temperature controlled zone, a target temperature (e.g., of a temperature controlled zone, of food products, of the heating element 880, of the thermally-regulated airflow, etc.), and/or a time until the target temperature is reached.

In one embodiment, the sensors 930 are positioned to monitor temperature controlled zones for the presence of food products. In some embodiments, the sensors 930 include an infrared sensor. In another embodiment, the sensors 930 include an LED with a phototransistor. In other embodiments, the sensors 930 include another type of sensor capable of monitoring the temperature controlled zone for the presence of products. In some embodiments, the sensors 930 are configured to monitor the temperature of the temperature controlled zones, the products, the thermally-regulated airflow, the cooling element, and/or the heating element 880. According to an alternative embodiment, one or more of the sensors 930 include temperature sensors positioned to monitor the temperature of the products, the temperature controlled zones, and/or the heating elements 880. The sensors 930 may include infrared temperature sensors, probes, or still other devices. The sensors 930 may be positioned within and/or on the shroud 830.

According to an exemplary embodiment, the controller 910 is configured to control at least one of the lighting elements 870, the heating element 880, the cooling element, the fan 890, and the humidifier based on inputs received from an operator using the user interface 920. By way of example, an operator may provide an input to engage or disengage the fan 890 to modulate the airflow characteristics of the thermally-regulated airflow exiting the temperature regulation unit 800. By way of another example, an operator may provide an input to turn on or off various components of the temperature regulation unit 800 (e.g., the lighting elements 870, the heating element 880, the fan 890, etc.).

According to an exemplary embodiment, the controller 910 is configured to control at least one of the lighting elements 870, the heating element 880, the cooling element, the fan 890, and the humidifier in response to readings from the sensors 930 and/or inputs received by an operator with the user interface 920. By way of example, an operator may provide an input for a desired temperature of a product. The controller 910 may adaptively control (i) the speed of the fan blades of the fan 890 to modulate the flow rate of the thermally-regulated airflow out of the temperature regulation unit 800, (ii) the temperature of the heating element 880 (e.g., by controlling the current and/or voltage provided to the heating element 880, etc.), and/or (iii) the temperature of the cooling element to maintain the desired temperature of the products (e.g., within a respective temperature controlled zone, etc.).

Figure 24:
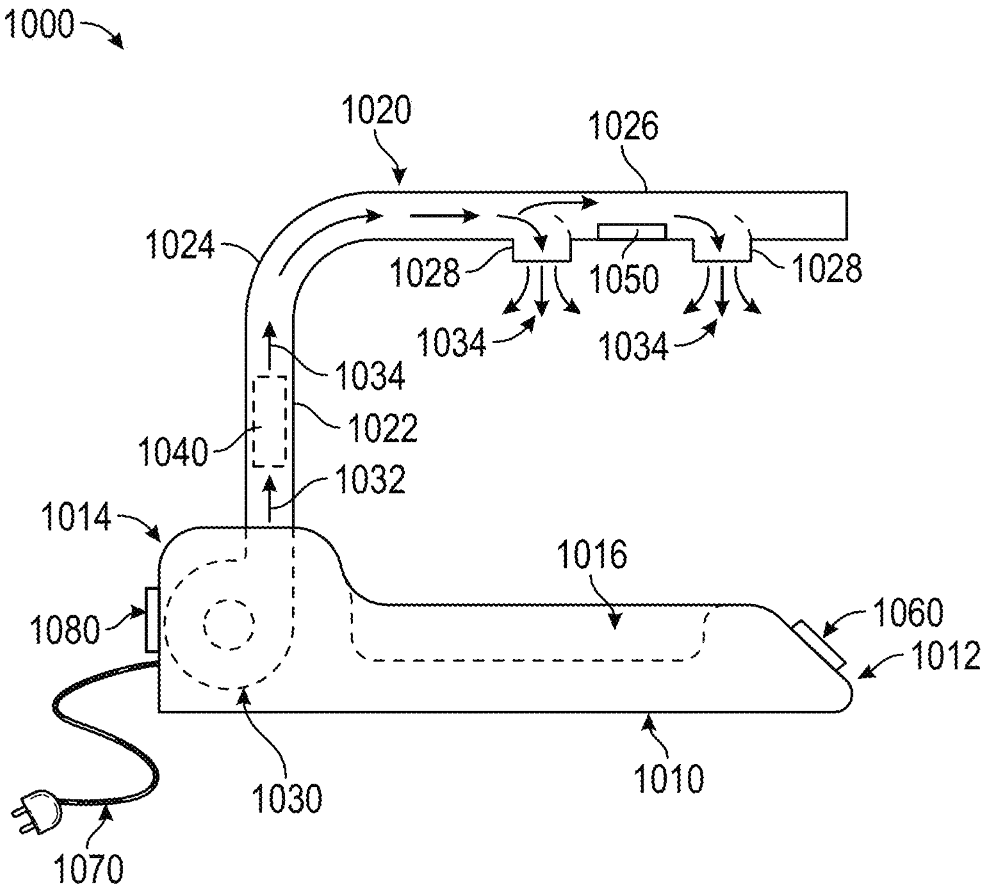
FIG. 24 is a side view of a portable food preparation unit, according to an exemplary embodiment.

According to the exemplary embodiment shown in FIG. 24, a portable food preparation unit, shown as temperature regulation unit 1000, is configured to be selectively repositionable (e.g., from one surface to another, etc.) to thermally regulate a food product at a desired location. According to an exemplary embodiment, the temperature regulation unit 1000 is configured to generate and provide thermal energy to heat a food product. In other embodiments, the temperature regulation unit 1000 additionally or alternatively removes thermal energy to cool a food product. As shown in FIG. 24, the temperature regulation unit 1000 includes body, shown as base 1010. The base 1010 has a first end, shown as front end 1012, and an opposing second end, shown as rear end 1014. The base 1010 defines one or more cavities or recesses, shown as food pans 1016, between the front end 1012 and the rear end 1014. The food pans 1016 may be configured to receive and hold a food product. In some embodiments, the food pans 1016 include a removable insert. As shown in FIG. 24, the temperature regulation unit 1000 includes a driver (e.g., a fan, a centrifugal fan, an air pump, etc.), shown as blower 1030, disposed within the rear end 1014 of the base 1010 and a conduit system, shown as duct system 1020, extending from the blower 1030, out of the rear end 1014 of the base 1010. The blower 1030 is configured to move or drive a fluid to produce an airflow 1032 (e.g., humidified air, hot air, cool air, ambient air, etc.)

through the duct system 1020. In one embodiment, the blower 1030 is a fixed speed blower. In another embodiment, the blower 1030 is a variable speed blower. According to an exemplary embodiment, the duct system 1020 is configured to receive the airflow 1032 provided by the blower 1030 and direct the airflow 1032 to a desired location (e.g., to a food product for heating and/or cooling purposes, a temperature controlled zone, the food pans 1016, etc.).

As shown in FIG. 24, the duct system 1020 includes a connection conduit, shown as connecting tube 1022, an elbow conduit, shown as elbow tube 1024, and an extension conduit, shown extension tubes 1026. In one embodiment, the connecting tube 1022, the elbow tube 1024, and the extension tube 1026 are a single, continuous tube. In other embodiments, the connecting tube 1022, the elbow tube 1024, and the extension tube 1026 are individual components that are couple together (e.g., welded, fastened, etc.). As shown in FIG. 24, the connecting tube 1022 extends vertically from the blower 1030 and the elbow tube 1024 bends the duct system 1020 such that the extension tube 1026 extends horizontally across a food pan 1016 of the base 1010. The extension tube 1026 defines a plurality of outlets, shown as airflow outlets 1028, disposed along the length thereof.

As shown in FIG. 24, the temperature regulation unit 1000 includes a thermal element, shown as heating element 1040, disposed within the duct system 1020. According to an exemplary embodiment, the heating element 1040 is configured to provide thermal energy to the airflow 1032 (e.g., to heat the airflow 1032, etc.) as the airflow 1032 flows over the heating element 1040 to perform a heating operation to thermally regulate a temperature of the airflow 1032 to a thermally-regulated airflow, shown as thermally-regulated airflow 1034, having a target temperature. The temperature regulation unit 1000 may thereby thermally regulate the temperature of a food product within the food pans 1016 positioned below the airflow outlets 1028 with the thermally-regulated airflow 1034 (e.g., by way of convective heat transfer, etc.), which is otherwise exposed to the surrounding environment (e.g., the food pans 1016 are not enclosed, etc.).

In some embodiments, the temperature regulation unit 1000 includes a plurality of blowers 1030, a plurality of duct systems 1020, and/or a plurality of heating elements 1040. By way of example, a plurality of duct systems 1020 may extend from the blower 1030 and correspond with a respective food pan 1016 (e.g., each food pan 1016 includes at least one corresponding duct system 1020, etc.). By way of another example, a plurality of blowers 1030 may be disposed within the base 1010 and have one or more duct systems 1020 extending from each of the plurality of blowers 1030. According to an exemplary embodiment, the temperature regulation unit 1000 has an independent heating element 1040 positioned within each of the duct systems 1020 to facilitate providing different amounts of thermal energy to the airflow 1032 of each duct system 1020. The temperature regulation unit 1000 may thereby vary the temperature of the thermally-regulated airflows 1034 exiting the airflow outlets 1028 of each extension tube 1026. For example, one of the thermally-regulated airflows 1034 may have a first temperature (e.g., one hundred fifty degrees Fahrenheit, etc.), a second one of the thermally-regulated airflows 1034 may have a second temperature (e.g., one hundred degrees Fahrenheit, etc.), a third one of the thermally-regulated airflows 1034 may have a third temperature (e.g., forty degrees Fahrenheit, etc.), etc. The temperature regulation unit 1000 may thereby facilitate maintaining a food product in one food pan 1016 at a different temperature than a food product in another food pan 1016.

According to an exemplary embodiment, the heating element 1040 includes a resistive heating element used to perform at least a portion of the heating operation of the temperature regulation unit 1000. The resistive heating element may receive electrical current (i.e., electrical energy) that is passed through a coil to generate heat (e.g., thermal energy, etc.), which is then transferred to the airflow 1032 to generate the thermally-regulated airflow 1034. According to an alternative embodiment, the heating element 1040 receives a heated working fluid as part of the heating operation. In other embodiments, the heating element 1040 includes a different type of heating element (e.g., an induction heating element, etc.).

According to an alternative embodiment, the thermal element additionally or alternatively includes cooling element (e.g., in place of or in combination with a heating element, etc.). For example, the thermal element may be or include a refrigerant coil that is used in a refrigeration cycle to perform a cooling operation on the airflow 1032. By way of example, a refrigerant coil may be used along with a working fluid (e.g., a refrigerant such as R-134a, etc.) in a refrigeration cycle. The working fluid flows through the refrigerant coil and absorbs thermal energy (e.g., evaporation, etc.) from the airflow 1032 to cool the airflow 1032 and a food product, reducing the temperatures thereof. The absorbed thermal energy (e.g., heat, etc.) is rejected into the surrounding environment (e.g., room, air, etc.) or ejected from the building through the remaining steps in the refrigeration cycle (e.g., compression, condensation, expansion, etc.). In other embodiments, the cooling element includes another type of cooling element (e.g., a thermoelectric cooler, etc.).

As shown in FIG. 24, the temperature regulation unit 1000 includes a light source, shown as the lighting element 1050. According to the exemplary embodiment shown in FIG. 24, the lighting element 1050 is disposed along the extension tube 1026 of the duct system 1020. In other embodiments, the lighting element 1050 is otherwise positioned (e.g., on the base 1010, on the elbow tube 1024, etc.). The lighting element 70 may be positioned and/or configured to illuminate a target area, illuminate a target environment, illuminate a food product, illuminate the food pans 1016, and/or provide decorative lighting to enhance the aesthetics of the temperature regulation unit 1000. The lighting element 1050 may include light bulbs, light emitting diodes (LEDs), or still other lighting devices.

As shown in FIG. 24, the temperature regulation unit 1000 includes an interface, shown as user interface 1060, positioned at the front end 1012 of the base 1010. In one embodiment, a user may control the temperature regulation unit 1000 with the user interface 1060. According to an exemplary embodiment, the user interface 1060 facilitates communication between an operator (e.g., a cook, a chef, a staff member, etc.) of the temperature regulation unit 1000 and one or more components of the temperature regulation unit 1000 (e.g., the blower 1030, the heating element 1040, the cooling element, etc.). By way of example, the user interface 1060 may include at least one of an interactive display (e.g., a backlit display, etc.), a touchscreen device, one or more buttons (e.g., a stop button configured to turn the unit off, buttons allowing a user to set a target temperature, etc.), switches, and the like. In one embodiment, the user interface 1060 includes a notification device (e.g., alarm, light, display, etc.) that notifies the operator when the lighting element 1050, the heating element 1040, the cooling element, and/or the blower 1030 are on, off, in a standby mode, in a heating mode, and/or in a cooling mode. According to an exemplary embodiment, a user may interact with the user interface 1060 to turn the temperature regulation unit 1000 on or off. According to another exemplary embodiment, a user may interact with the user interface 1060 to enter a desired operating set point (e.g., an operating power level, an operating temperature, etc.) and/or increase or decrease the operating set point for the heating mode of operation and/or the cooling mode of operation of the temperature regulation unit 1000. In another embodiment, a display shows a current temperature of the heating element 1040 (and/or the cooling element), a current temperature of the thermally-regulated airflow 1034, a current temperature of the food pans 1016, a target temperature (e.g., of the food pans 1016, of the food products, of the heating elements 1040, of the thermally-regulated airflow 1034, etc.), and/or a time until the target temperature is reached.

As shown in FIG. 24, the temperature regulation unit 1000 includes a controller, shown as controller 1080, coupled to the rear end 1014 of the base 1010. In other embodiments, the controller 1080 is otherwise positioned (e.g., internally within the base 1010, etc.). According to an exemplary embodiment, the controller 1080 is configured to control the temperature regulation unit 1000. In one embodiment, the controller 1080 is configured to selectively engage, selectively disengage, control, and/or otherwise communicate with components of the temperature regulation unit 1000. The controller 1080 may be coupled to the lighting element 1050, the heating element 1040 (and/or cooling element), the blower 1030, and/or the user interface 1060. The controller 1080 may send and/or receive information and/or signals (e.g., command signals, etc.) to and/or from the lighting element 1050, the heating element 1040 (and/or cooling element), the blower 1030, and/or the user interface 1060.

According to an exemplary embodiment, the controller 1080 is configured to control at least one of the lighting element 1050, the heating element 1040 (and/or cooling element), and/or the blower 1030 based on inputs received from an operator using the user interface 1060. By way of example, an operator may provide an input to engage or disengage the blower 1030 and/or the heating element 1040 to modulate the airflow characteristics of the thermally-regulated airflow 1034 exiting the extension tube 1026. By way of another example, an operator may provide an input to turn on or off various components of the thermal regulation systems 10 (e.g., the lighting element 1050, the heating element 1040, the blower 1030, etc.).

As shown in FIG. 24, the temperature regulation unit 1000 includes a power source, shown as power cable 1070, configured to facilitate powering the components of the temperature regulation unit 1000 (e.g., the blower 1030, the heating element 1040, the lighting element 1050, the user interface 1060, the controller 1080, etc.). According to an exemplary embodiment, the power cable 1070 is configured to interface with a power outlet (e.g., a 110 volt wall outlet, a 120 volt wall outlet, a 230 volt wall outlet, etc.) to electrically couple the temperature regulation unit 1000 to mains power. In some embodiments, the temperature regulation unit 1000 includes an energy storage device (e.g., a battery, etc.) configured to store electrical energy to power the temperature regulation unit 1000 when the power cable 1070 is not coupled to a power outlet.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A temperature regulation unit comprising:

a housing having an upper end and a lower end, the housing defining an internal cavity;

an electrical connector extending from the upper end of the housing;

a bracket positioned within the internal cavity of the housing, the bracket including:

a first flange having a first side and an opposing second side, the first flange defining an aperture; and a second flange extending perpendicularly from the first flange and longitudinally along a sidewall of the conduit;

a conduit positioned within the internal cavity of the housing and defining a passage, the conduit having a first end and an opposing second end, the conduit extending through the aperture of the first flange such that the first end of the conduit is positioned above the first side of the first flange and the opposing second end is positioned below the opposing second side of the first flange, wherein the second flange extends longitudinally along the conduit from the first flange toward the opposing second end of the conduit;

processing electronics positioned within the internal cavity and disposed on the second flange such that the processing electronics are positioned along the sidewall of the conduit;

a fan positioned within the internal cavity of the housing and external to the passage of the conduit, the fan secured to the first side of the first flange and positioned proximate the first end of the conduit, the fan configured to provide an airflow to the passage of the conduit; and a thermal element positioned within the passage of the conduit, the thermal element configured to thermally regulate a temperature of the airflow flowing through the conduit and out of the opposing second end of the conduit, the thermal element including at least one of a heater or a thermoelectric cooler.

2. The temperature regulation unit of claim 1, wherein the electrical connector is a male electrical connector configured to interface with a female electrical connector.

3. The temperature regulation unit of claim 1, wherein the lower end of the housing defines an outlet, further comprising a cover positioned to at least partially enclose the outlet and a light coupled to an exterior surface of at least one of the cover or the housing.

4. The temperature regulation unit of claim 3, wherein the light is positioned to illuminate an area being thermally regulated by the airflow.

5. The temperature regulation unit of claim 3, wherein the light is coupled to the exterior surface of the cover.

6. The temperature regulation unit of claim 3, wherein the light includes at least one of a light bulb or a light-emitting diode.

7. The temperature regulation unit of claim 3, wherein the cover defines an aperture that receives the opposing second end of the conduit.

8. The temperature regulation unit of claim 1, further comprising a body positioned within the airflow passage, wherein the thermal element is wrapped around the body.

* * * * *